United States Patent [19]

Kelley et al.

[11] Patent Number: 5,038,539

[45] Date of Patent: * Aug. 13, 1991

[54] WORK SPACE MANAGEMENT SYSTEM

[75] Inventors: James O. Kelley, Spring Lake, Mich.; William E. Stumpf, Minneapolis, Minn.

[73] Assignee: Herman Miller, Inc., Zeeland, Mich.

[ * ] Notice: The portion of the term of this patent subsequent to Oct. 31, 2006 has been disclaimed.

[21] Appl. No.: 396,931

[22] Filed: Aug. 21, 1989

Related U.S. Application Data

[63] Continuation of Ser. No. 35,351, Apr. 7, 1987, abandoned, which is a continuation-in-part of Ser. No. 648,900, Sep. 10, 1984, Pat. No. 4,685,255.

[51] Int. Cl.⁵ .................................... E04H 1/06
[52] U.S. Cl. .................................. 52/239; 52/28; 52/36; 52/238.1; 211/190; 211/208; 312/282
[58] Field of Search ................... 52/28, 36, 238.1, 239, 52/474, 483; 108/109; 211/187, 193, 208, 88, 182, 103, 190; 312/242, 245, 282, 350

[56] References Cited

U.S. PATENT DOCUMENTS 2,260,178 10/1941 Guignon, Jr. .
2,363,327 11/1944 Hodkgins et al. .
3,103,708 9/1963 Pomeroy et al. .
3,195,698 7/1965 Codrea .
3,328,927 7/1967 Kates .

(List continued on next page.)

FOREIGN PATENT DOCUMENTS 0027001 9/1980 European Pat. Off. .
3530714A1 8/1985 Fed. Rep. of Germany .
2508524 6/1981 France .
1562395 7/1976 United Kingdom .

OTHER PUBLICATIONS

Teknion (Office Furniture Systems); 1982, Teknion Furniture Systems Inc. (7 pages).
Teknion (Office Furniture Systems); 1982, Teknion Furniture Systems Inc. (17 pages).
Teknion (Office Furniture Systems); price list, Teknion Furniture Systems Inc. (34 pages) Apr. 1983.

Primary Examiner—Michael Safavi

[57] ABSTRACT

A work space management system for dividing a space into separate work areas comprising a wall system having a rigid framework formed of rigid rectangular frames rigidly joined together at the edges thereof to form at least one work area, wire management elements secured to the frames for communication and power wiring and a plurality of selectively relocatable modular tiles removably hanging on the frames. Some of the wire management elements are secured to the bottom or baseline of the frames and some of the wire management elements are removably secured to a waistline or midportion of at least some of the frames. The frames can extend to a waist height, a seated height, to a standing or full floor to ceiling height in a modular stepped fashion. Decorative and functional modular tiles are sized to fit on the frames to substantially cover the frames, and are independently and removably mounted thereto. The tiles are of equal height and of variable modular width to cover the frames. Further, the tiles are easily mounted to and removed from the frames so that the tiles are relocatable and interchangeable with one another within the same frame and among the different frames for ease of customizing work stations within the system. The work space management system provides an architectural wall partition system with flexibility for interchangeable tile panels for different decorative effects and various functional features. The tiles can be painted, fabric, or vinyl covered, or can comprise acoustical tiles, window tiles, work-in-process rail tiles, lighting tiles, tackable tiles, marker tiles, data display tiles, display tiles, shelf tiles, open pass-through tiles, wire management tiles, mail tiles, storage tiles, heater tiles, and cooling and air circulation tiles.

24 Claims, 18 Drawing Sheets

| | | |
|---|---|---|
| 3,377,756 | 4/1968 | Polhamus . |
| 3,394,507 | 7/1968 | Doke . |
| 3,418,765 | 12/1968 | Propst et al. . |
| 3,429,090 | 2/1969 | Metelnick . |
| 3,430,997 | 3/1969 | Propst et al. . |
| 3,449,877 | 6/1969 | Beckman . |
| 3,517,467 | 6/1970 | Propst et al. . |
| 3,706,171 | 12/1972 | Shayman . |
| 3,712,709 | 1/1973 | Kenworthy . |
| 3,713,257 | 1/1973 | Beavers . |
| 3,721,050 | 3/1973 | Perina . |
| 3,733,755 | 5/1973 | Butler . |
| 3,759,297 | 9/1973 | Anderson et al. . |
| 3,774,988 | 11/1973 | Rogers . |
| 3,797,184 | 3/1974 | Thompson . |
| 3,839,834 | 10/1974 | Goddard . |
| 3,997,220 | 12/1976 | Mayer . |
| 4,020,604 | 5/1977 | Legler et al. . |
| 4,031,675 | 6/1977 | Roberts et al. . |
| 4,043,626 | 8/1977 | Propst et al. . |
| 4,056,297 | 11/1977 | Gartung . |
| 4,076,350 | 2/1978 | Crist . |
| 4,123,879 | 11/1978 | Blodee et al. . |
| 4,203,639 | 5/1980 | VandenHoek et al. . |
| 4,224,769 | 9/1980 | Ball et al. . |
| 4,231,630 | 11/1980 | Propst et al. . |
| 4,232,183 | 11/1980 | Person . |
| 4,235,495 | 11/1980 | Propst et al. . |
| 4,255,610 | 3/1981 | Textoris . |
| 4,255,611 | 3/1981 | Propst et al. . |
| 4,257,203 | 3/1981 | Propst et al. . |
| 4,277,123 | 7/1981 | Haworth et al. . |
| 4,375,829 | 3/1983 | Dorr et al. . |
| 4,382,648 | 5/1983 | Propst et al. . |
| 4,423,573 | 1/1984 | Omholt et al. . |
| 4,448,003 | 5/1984 | Hasbrouck . |
| 4,450,970 | 5/1984 | Shepherd . |
| 4,535,577 | 8/1985 | Tenser et al. ............... 52/221 |
| 4,567,698 | 2/1986 | Morrison . |
| 4,571,907 | 2/1986 | DeFouw et al. . |
| 4,607,753 | 8/1986 | Radek . |
| 4,625,477 | 12/1986 | Johnstonbaugh . |
| 4,876,835 | 10/1989 | Kelley et al. ..................... 52/239 |

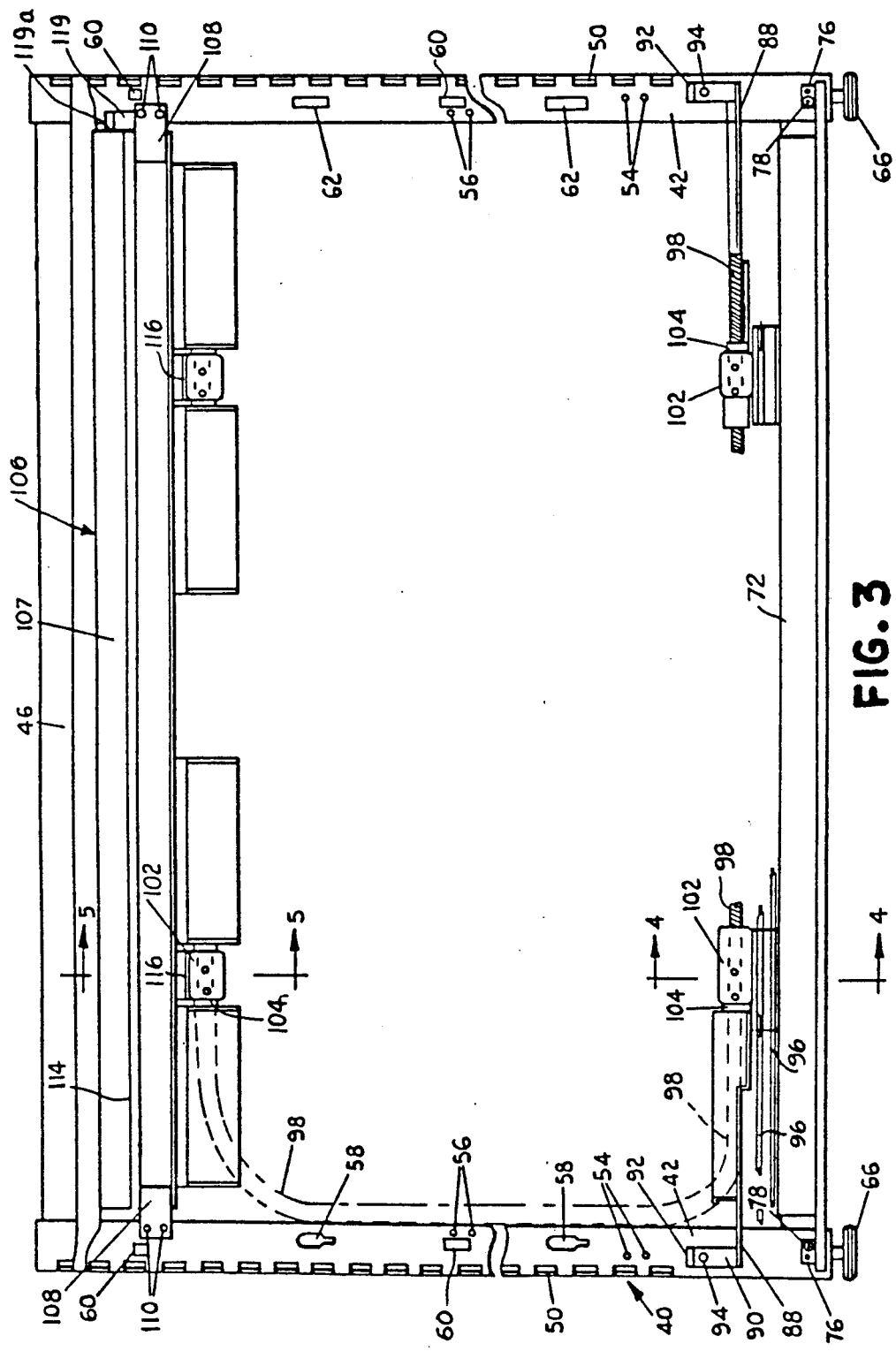

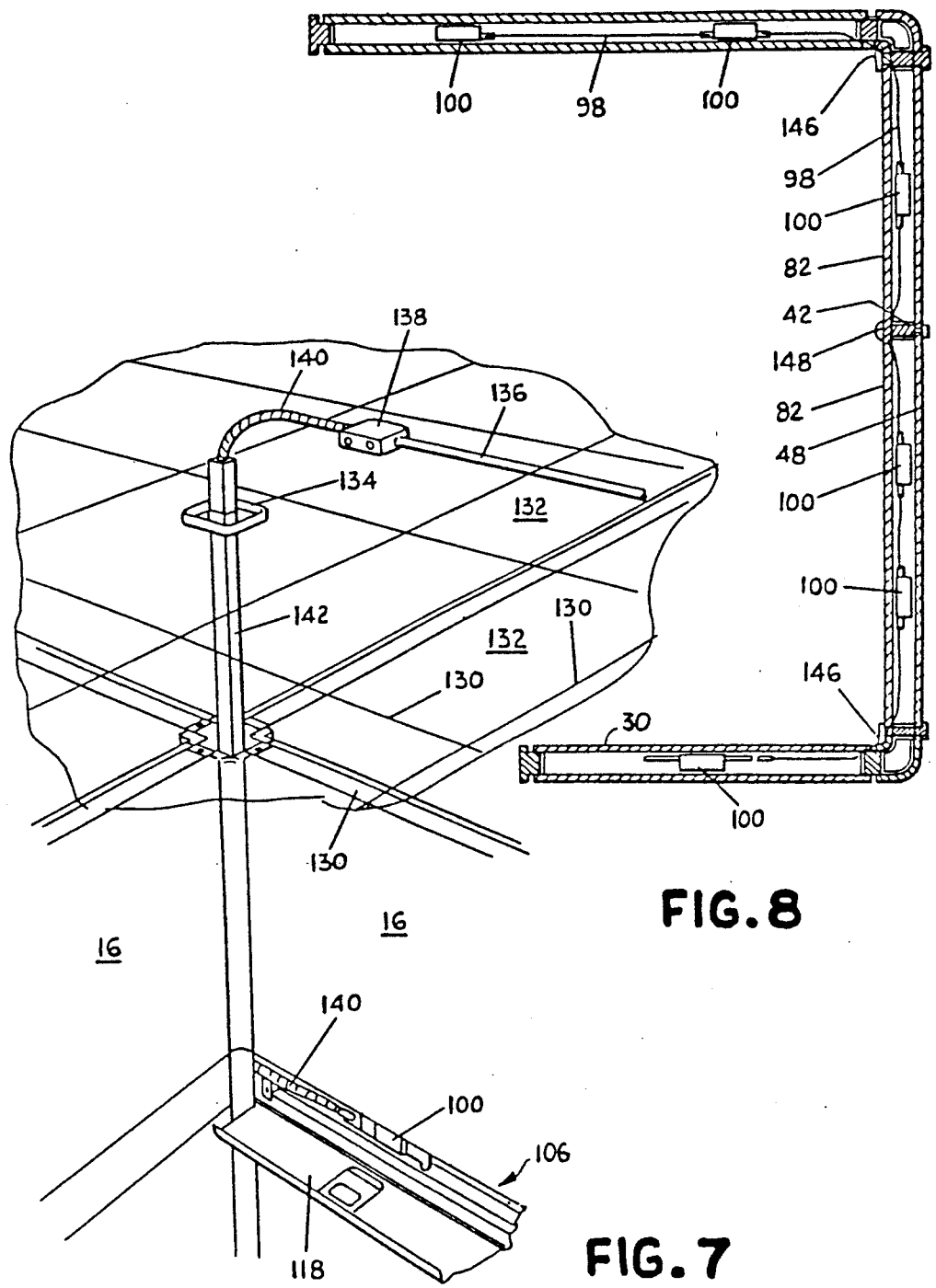

WORK SPACE MANAGEMENT SYSTEM

TECHNICAL FIELD

This invention relates to work space management systems. In one of its aspects, the invention relates to a work space management system wherein walls are easily constructed, configured and changed, and wherein modular functional wall tiles and work tools are easily configured, changeable and relocatable within the system without interfering with the underlying rigid frame structure.

BACKGROUND ART

Open-plan office systems, pioneered by Herman Miller, Inc., more than fifteen years ago, provide a series of rigid panels which in turn are rigidly connected together at facing edges to divide work spaces into work or task areas. The panels are quickly and easily coupled together at facing edges for straight line, angled coupling or multiple wall coupling. Vertical slots are provided at the facing edges to support brackets for hanging functional components such as cabinets, shelves and work surfaces exterior to the panel to efficiently use the space. Examples of such wall panel systems are disclosed in the following U.S. patents:
Propst et al, 3,418,765, issued Dec. 31, 1968;
Propst et al, 3,430,997, issued March 4, 1969;
Beckman, 3,449,887, issued June 17, 1969;
Propst et al, 3,517,469, issued June 30, 1970.

In these and other currently popular panel systems, the panels are preassembled and covered at the factory with a fabric or a vinyl covering. Accoustical panels are also preassembled at the factory. These panels must be professionally installed and arranged. Although the panels are easily changed to change configuration, such changing must be done professionally. Once the color scheme is set, it cannot be changed without returning the panels to the factory or otherwise sending the panels out for recovering. Thus, the panel colors are ordinarily not changed.

Electrical systems were later provided as an addition to the panels. Typically, the electrical systems are provided underneath the panels and are not integrated with the panels. In some cases, the electrical system is removably secured through the slotted hanging intelligence in the panel frames. Examples of electrical systems used with panels are disclosed in the following U.S. patents:
Propst et al, 4,382,648, issued May 10, 1983;
Propst et al, 4,257,203, issued March 24, 1981;
Propst et al, 4,255,611, issued March 10, 1981;
Propst et al, 4,235,495, issued Nov. 25, 1980;
Propst et al, 4,231,630, issued Nov. 4, 1980;
Propst et al, 4,043,626, issued Aug. 23, 1977;
Textoris, 4,255,610, issued March 10, 1981;
Gartung, 4,056,297, issued Nov. 1, 1977;
Haworth et al, 4,277,123, issued March 7, 1981;
VandenHoek et al, 4,203,639, issued May 20, 1980.
Anderson et al, 2,759,297, issued Sep. 28, 1973.

Because of the preassembled factory construction, the electrical outlets are provided at the baseline of the panels. Electrical wiring must be run up from the base line to the service area on the outside of the panels. Ordinarily, internal wiring on a selective basis is not possible without custom manufacturing. Even with custom manufacturing, changes cannot be implemented. Utility channels for wiring have, in some cases, been hung onto panels, for example, as shown in Anderson et al.

Attempts have been made to treat these problems in the past. Palhamus in U.S. Pat. No. 3,377,756, issued April 16, 1968, discloses a demountable partition construction in which aluminum channels are joined together to provide a framework. The channels have hollow interiors with snap-fit covers and a removable flange to retain the panels within the flanges. Convenience outlets can be provided in the wall panels in conventional fashion.

A similar partition structure is disclosed by Codrea in U.S. Pat. No. 3,195,698, issued July 20, 1965. The Codrea partition structure is formed by a rigid metal framework in which opaque and clear panels are captured between retaining flanges in the frame. The panels are said to be removable from the frame by removing certain of the retaining flanges. Electrical wiring channels are formed in the framework and are covered by removable closure strips.

Dorr et al in U.S. Pat. No. 4,375,829, issued March 8, 1983, discloses a framing system for displays, but otherwise is similar to Palhamus. H-shaped channels are joined together at the ends thereof through L-shaped fasteners like a picture frame. The frames can be arranged vertically, one above the other, with a horizontally oriented tubular joiner there between. Panels can be attached to the framework through Velcro fasteners. Electrical power is supplied to the frame through a power plug at the top of the frame.

More recently, it has been proposed to provide a replaceable acoustical panel for a rigid metal frame. An example of one such system is shown in U.S. Pat. No. 4,423,573, issued Jan. 3, 1984, and U.S. Pat. No. 4,123,879, issued Nov. 7, 1978.

A modular panel arrangement for factories is disclosed in the U.S. patent to Goddard, U.S. Pat. No. 3,839,834, issued Oct. 8, 1974. In Goddard, standard-sized wire mesh panels are bolted to sleeve-like posts which are joinable end-to-end through a resilient connecting insert. The posts can mount windows and doors as well as the wire mesh panels.

Although the current open-plan systems remain a viable solution for many office environments, some business organizations have functional and esthetic requirements which cannot be practically or commercially met by these open-plan systems. These new requirements are driven in large measure by the increasing use of computer equipment in the office, by the increasing frequency with which work teams and processes change, by ergonomics of the new computer-driven work place and by new standards regarding personal and human-sensitive work places throughout all levels of the business environment.

Due to rapidly changing business conditions, work teams and work processes change much more rapidly than in the past. The physical environment must be capable of supporting these changes quickly and easily. The office space-management system must be easy to manage in terms specification, design and installation. The current open-plan systems do not meet these needs.

The inflexibility of computer terminals and peripheral equipment puts a greater demand on the physical environment to meet the postural, visual and social needs of the office workers. Many office tasks which were once accomplished by moving or walking about, and through face-to-face meetings with other workers, are now handled by the video display terminal (VDT).

Individual control over lighting, operator positioning and balance between privacy and communication is important to psychological comfort and productivity. Thus, a modern VDT-containing work station must adjust to the physical as well as psychological needs of the individual worker and serve as a buffer between him or her and the inflexible computer hardware. The current open-plan system does not adequately meet these needs.

While fine finishes and materials have long been associated with the senior management level, there is a trend away from bland institutional environments and toward more personal and human-sensitive work places throughout different levels of the business organization. Changing corporate values of a more participative management style, as well as the growing importance and power of the white-collar worker also contribute to the increasing demand for customized or user-influenced and more functional work environments. Customization has heretofore required special processing which is costly and lengthy for both customers and manufacturers. Thus, current open-plan systems do not respond to these needs.

It has recently been recognized that there should be a certain openness or porosity in the work area. In other words, there must be a certain amount of openness in the walls of work spaces for light, air movement, communication and work-in-process flow without losing integrity of the enclosures. In addition, there is an increasing recognition, and in some cases a requirement, that workers have visual access to exterior light and to exterior and interior views.

The current open-plan system contemplates the use of dedicated glazed panels in a wall of panels which are joined together at edge portions thereof. These glazed panels are dedicated panels like the fabric-covered panels and do not lend themselves to a rapidly changing environment or customized work stations. Current open plan systems do not respond to the need for porosity and flexibility in the workplace.

SUMMARY OF THE INVENTION

According to the invention, a work space management system divides a space into separate work areas and comprises a rigid framework formed of rigid rectangular frames rigidly joined together at the edges thereof to form at least one work area. Each of the frames has faces and receiving means. Each of a plurality of interchangeable tiles of relatively equal modular size and a common height has an independent attaching means cooperating with the receiving means on the frames for removably mounting the tiles to the frames for ease of placement on and removal from the frames, preferably without the use of any tools. The tiles are mounted to the outer faces of both sides of the frames in parallel relationship, the tiles have a width substantially equal to the width of the frames to which they are mounted and to have a height such that at least two of the modular tiles are mounted in vertical juxtaposition on each of the frames. One set of the tiles has a decorative surface and another set of the tiles have a structure to serve a function other than decorative in the work area defined by the framework and tile. Thus, the decorative and functional tiles can be interchanged easily and quickly on the same or different frames. Further, the independent attaching means allows each tile to be placed and replaced randomly and independently of adjacent tiles.

Preferably, the rigid framework has an open central portion thereof. The frames are of the type which have a vertical row of slots in the face thereof and near the edges thereof for receiving bracket hooks to suspend functional components and functional tiles from the frames. At least some of the tiles have a width slightly less than the width of the one set of frames so that the tiles, when mounted on the frames, extend to a point short of the vertical row of slots and leave the slots exposed to allow suspension of functional components therefrom.

Preferably, the tile-receiving means comprise openings in the face of the frames and the attaching means on the tiles comprise hooks which fit within the openings. Further, the attaching means on the tiles comprise spring clips to releaseably fit within the frame openings. Thus, the tiles can be removed from the frames by pulling outwardly on the tiles. Typically, the hooks are first placed within openings in the frame at an acute angle to vertical for accurate registration on the frame and the tile is thereafter rotated into place on the frame. This placement system permits independent mounting of the tiles on the frame so that each tile can be mounted on the frame independent of any adjacent tile.

The functional tiles can take many different forms. For example, a light-transmitting window can be formed by two of the functional tiles which are mounted on opposite sides of the frame in juxtaposition to each other and have means to form a window in the wall formed by the frames and the tiles. Typically, the window-forming means comprises at least one light-transmitting pane, and preferably two light-transmitting panes, each of which is mounted to an outer casement which covers portions of the frames.

The light-transmitting pane can be transparent, translucent, partially mirrored or one which selectively controls the passage of light through the tile. The light-transmitting window tiles provide light and visual porosity to the work area without affecting the structural or acoustical integrity of the walls.

Other functional tiles include a marker tile comprising a hard outer surface for an erasable medium, a tackable tile, an illumination tile in which illumination means are mounted behind a translucent panel or on an outer surface of the tile to preform indirect lighting, a work-in-process tile comprising a plurality of rails on which work tools can be mounted. Another functional tile comprises a shelf tile in which a shelf panel is pivotably mounted in a housing for movement between a vertical position flush with the adjacent tiles and a horizontal position when the shelf panel is perpendicular to the plane of the frame.

The functional tile can also comprise simply an opening wherein tiles have open rectangular rims mounted to opposite sides of the frame in juxtaposed position and having openings therethrough in registry with each other. A shelf can extend through the opening in the two juxtaposted tiles.

Another functional tile is a heater tile wherein a heating element is embedded in a heater tile. Air flow and cooling can be incorporated into the tiles as well.

A functional tile can also comprise a cabinet which extends into the open space between the frames. Cabinets can comprise a back wall, side walls, top and bottom walls defining an open front and a door mounted in the open front. The door in the open front can be pivotably mounted to the top wall of the cabinet for vertical swinging motion with respect to the top wall. The side walls at the front edges thereof can slant downwardly and outwardly so that the front door is mounted at an angle to the vertical. A ledge is positioned on the bottom of the front door so that the front door can serve as a display shelf.

Still another functional tile can comprise a data display tile in which information is projected or otherwise presented on a screen from behind. Thus, a video display screen can be built into a functional tile.

Finally, some of the functional tiles can comprise wire management modules by which electrical and/or communication wiring can be mounted to the frames and accessible to the users within the work space defined by the work space management system. In the case of wire management modules, there are two separate tiles which together make a wire management tile module.

The invention provides a space divider system in which functional tools and components can be integrated into a panel system along with visual components. The functional tools and components can be easily mounted, rearranged and interchanged with each other and with the decorative components. The changes can be made quickly and easily without the use of work tools and without specialized high cost labor. The removable tile modules make the work space easy to manage in terms of specification, design and installation. The system allows for elevational as well as plan layout in designing the work space. The functional components permit the application of acoustics, light transmission, visual communication and material process flow not heretofore possible with prior open plan systems. Yet the integrity of the open plan is maintained.

The modularity of the tiles and the integration of the tiles with the electrical and communication cable requirements responds to the postural, visual and social needs of the office worker in a computer driven and other work environment. The functional tile modules give the worker individual control over lighting, operator positioning and balance between privacy and communication to provide a buffer between him or her and the work environment. The tile modules and sizing allow for seated, open communication and material work flow; seated privacy; standing privacy and full height privacy. Further, the interchangeable tile modules permit a worker to customize his or her work station with fabric and finishes reasonably inexpensively and easily without special and lengthy order procedures. In addition, the window tiles and open tiles give the system the selective porosity required to enhance the workspace without losing the acoustic integrity of the walls.

BRIEF DESCRIPTION OF THE DRAWINGS

The invention will now be described with reference to the accompanying drawings in which:

FIG. 3 is an elevation view of a frame with electrical and communication service wiring;

FIG. 7 is a perspective view showing the introduction of electrical service through the ceiling and power pole;

FIG. 8 is a schematic view of a horizontal section through a wall panel at the beltline showing the manner in which electrical and cabling pass from panel to panel;

DETAILED DESCRIPTION OF THE DRAWINGS

Figure 1:
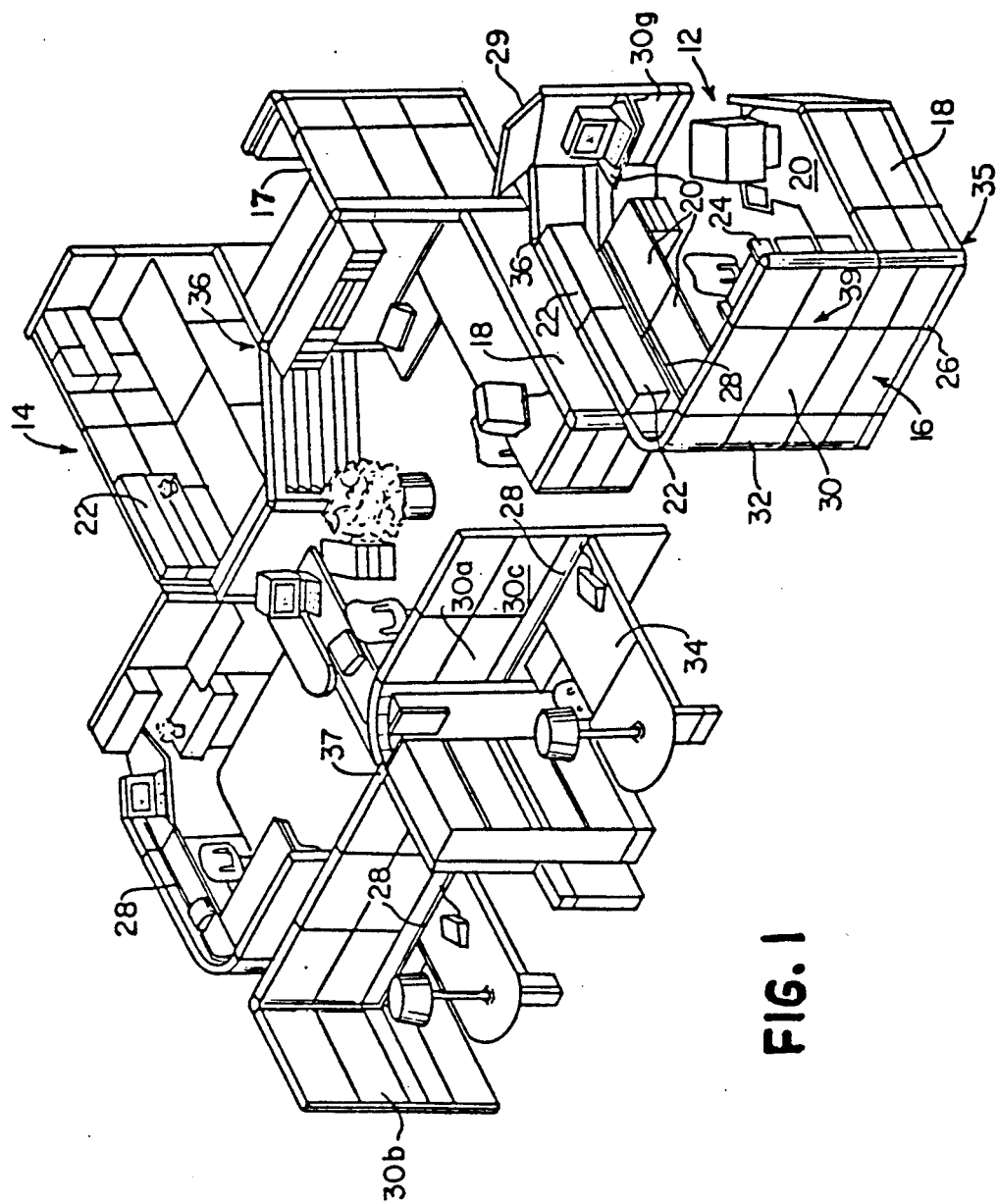
FIG. 1 is a perspective view of an office environment showing a wall panel system according to the invention.

Referring now to the drawings and to FIG. 1 in particular, there is shown an office environment having a single work station 12 and a multiple work station 14. Standing height walls 16, intermediate walls 17 and short walls 18 define the single work station. The standing height walls 16 are typically about 70 inches high, the intermediate walls are about 54 inches high and the short walls 18 are typically just above work surface height or about 38 inches tall. Work surfaces 20 are mounted on the walls 16 in cantilevered fashion. Hanging cabinets 22 and shelves 24 are also supported by the walls 16. The walls are defined by straight tiles 30 and curved tiles 32. A baseboard wire management assembly 26 is provided at the base of each of the walls and a waistline wire management assembly 28 is provided at a midpoint in the walls in selected locations. A slanted panel 29 having an acoustical material is provided as an extension to one portion of the walls 16. A tile 30a can have a hard surface for a marker or chalk board. A tile 30b comprises a translucent panel with a source of illumination (not shown) behind it to provide illumination to the tile. A tile 30c can have a wood veneer surface thereon. A tile 30g can have a heating element (not shown) embedded therein to provide heat to a local space.

The multiple work station 14 is of similar nature and is formed by standing height walls 16, intermediate height walls 17 and short walls 18 which are interconnected. Work surfaces 20, hanging cabinets 22 and shelves 24 are also provided on these walls. In addition, both baseboard wire management assemblies 26 and waistline wire management assemblies 28 are provided in selected locations. A table 34 can be partially supported by the walls and have an outboard support beneath the outer end thereof. Ninety-degree joints 35, 120° joints 36 and T-wall connections 37 are formed between various panels as desired. Further, straight-wall connections 39 are formed between both straight-wall and curved-wall sections.

Figure 2:
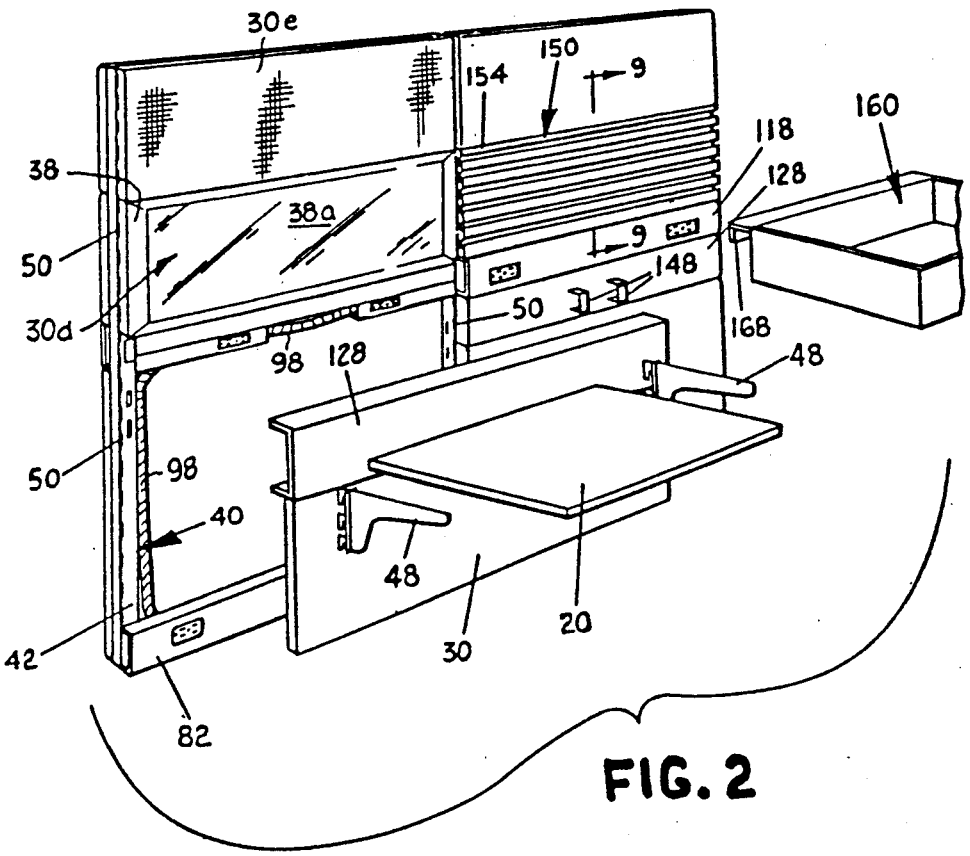
FIG. 2 is an exploded perspective view of a wall panel assembly.
Figure 4:
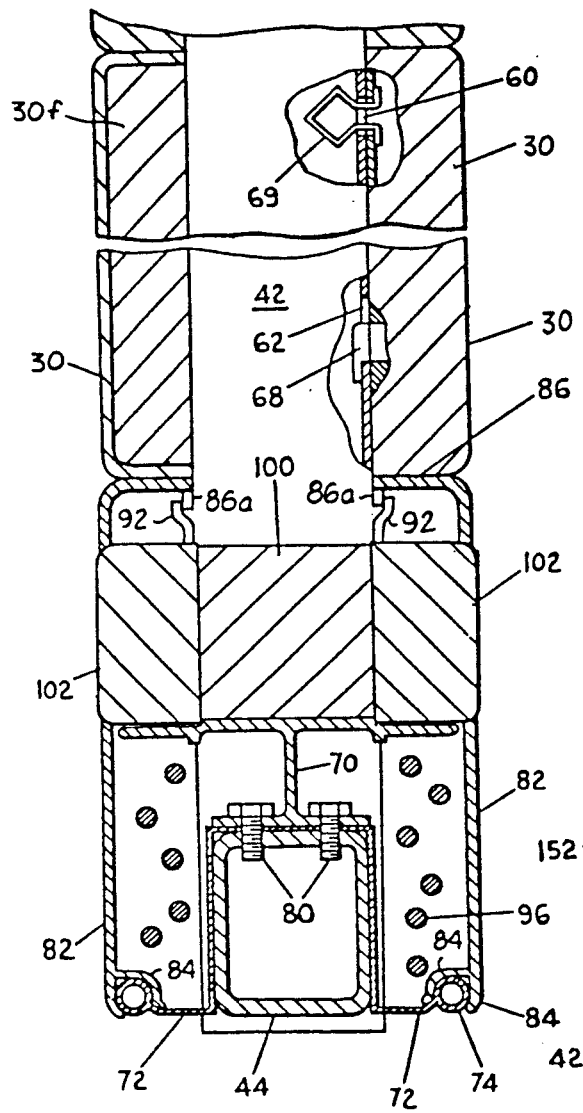
FIG. 4 is a sectional view taken along lines 4—4 of FIG. 3.

Referring now to FIGS. 2 and 3, there is shown a frame 40 comprising a pair of identical vertical members 42 welded to horizontal members 44 and 46. The underlying frame need not have a furniture grade finish and can be formed by roll-forming or other suitable metal-forming techniques. Equal-size tiles 30 are removably secured to the frame 40. The term "tile" is used to designate removable panel modules which hang on the outside surface of the frame 40, thereby leaving the interior of the frame open. Each of the tiles 30 is of identical height and shape but may have a different width to match the width of the frame on which it hangs. Also, the tiles can have different outer surfaces or may have acoustical treatment in an interior thereof. For example, the outer surface of the tiles 30 may be covered with a fabric 30e or vinyl material or wood veneer (30c), or can be painted. The tiles 30 can be formed from a metal pan, turned inwardly at the edges and covered or painted as desired. Insulation 30f can be provided within the metal pan as shown in FIG. 4, if desired. Typically, the tiles 30 have a height of about 16" and a width substantially the width of the frame 40 which can vary between standard widths. The frames 40 have a height which is an integer of the height of the tiles plus the height of the baseboard wire management assembly 26 so that the tiles form a regular, even pattern on the frames. Thus two tiles and a baseboard wire management assembly 26 have a height of 38 inches for seated open visual communication and work-in-process flow. The next size would be 54 inches, formed of three tiles and assembly 26, which allow seated privacy and/or visual communication and/or environmental porosity. The next size would be 70 inches, formed of four tiles and assembly 26, which allow for standing privacy, visual communication and/or environmental porosity, depending on the tiles selected. Finally, the size can be extended in modular units up to the ceiling as full height walls. The modularity of the tiles, especially the height modularity, provides a strong horizontal visual pattern to arrangements of walls containing such tiles as illustrated in FIG. 1.

The tiles 30 can also provide functional support for the work area. For example, window tile 30d as shown in FIG. 2 can provide visual and light porosity to the space. The window tile 30d can thus function as a window between work stations on opposite sides of the frame 40. As shown, window tile 30d has an outer casement 38 which supports light-transmitting pane 38a of glass or plastic and which covers the sides of the frame members 42. Alternatively, a trim segment can be attached to an interior steel frame to enable pass-through access from one side of the pane to another. If desirable, a clear panel of glass or plastic can be placed between the trim segments to make a window.

The light-transmitting pane 38a can be transparent, translucent or can be partially mirrored to allow one way viewing and to reflect borrowed light from adjacent areas on one side of the panel. The pane 38a could be completely mirrored for complete reflection of light from both sides or either side of the wall. Alternatively, the pane 38a can be configured to be light adjustable to control the amount of light to pass through the pane.

Vertical rows of slots 50 are provided on the outside corners of each of the vertical members 42 to receive standard brackets 48 with hooks for supporting the work surfaces 20, the hanging cabinets 22 and the shelves 24. Pairs of screw holes 54 and 56 are provided in spaced relationship along the height of the vertical members 42. Keyhole slots 58 are provided on one side of the vertical members 42 and square openings 60 are provided above the keyhole slots 58 in spaced relationship thereto. Rectangular openings 62 are provided on the other side of the vertical members 42 in juxtaposition to the keyhole slots 58. Square openings 60 are also provided above the rectangular openings 62. A weld nut (not shown) is secured underneath the frame on the horizontal member 44 and an adjustable foot 66 is threaded into the weld nut to adjust the height of the panel sides.

Referring to FIGS. 3 and 4, an I-shaped bracket 70 is secured to the top of the horizontal member 44 through rivets or bolts 80. An elongated chase 72 is captured between the I-shaped bracket 70 and the horizontal member 44. The elongated chase 72 extends across the top and down along each side of the horizontal member 44, extending outwardly thereof and defining a hinge-forming tube 74 at the outer end thereof. The hinge-forming tube 74 extends laterally in overlapping relationship to the vertical members 42 and has attaching flange 76 with holes in registry with the frame screw holes (not shown). Screws 78 extend through the flange 76 and are tapped into the frame screw holes to secure the ends of the hinge-forming tube 74 to the frame 40.

A hinged cover 82 has socket-forming flanges 84 at the bottom portion thereof which receive the hinge-forming tube 74 to pivotably mount the hinged cover 82 to the elongated chase 72. An inwardly directed flange 86 at the top of the hinged cover 82 fits beneath the tile 30 and extends to the vertical frame member 42. A cover retainer 88 extends laterally from the elongated chase 72 and has an upwardly-extending end flange 90 with a spring retainer 92 at the top portion thereof. A screw 94 extends through a hole in the end flange 90 and into a screw hole 54 to secure each end flange 90 to a vertical member 42. The inwardly directed flange 86 has a downwardly-extending projection 86a which is snap-fit with the retainer 92 to hold the hinged cover 82 in place in front of the elongated chase 72. Alternately, the cover 82 can have a projecting prong (not shown) with an upwardly-extending lip at the sides of the cover. The frame 40 can have horizontal slots (not shown) on the vertical members 42 in registry with the prongs to releaseably retain the cover in closed position. The hinged cover 82 also has a hinged access cover 95 (FIG. 6) at spaced locations there along to provide an opening for communication cabling to pass therethrough.

Communication wiring 96, including telephone and computer wiring, is laid in the elongated chase 72 behind the hinged cover 82. A flat electrical cable or festoon 98 extends through the upper portion of the elongated chase 72 and is connected to an energy distribution block 100 through a connector 104. A convenience outlet 102 can be plugged into the energy distribution block 100. As seen in FIG. 4, the convenience outlet 102 extends out through an opening in the hinged cover 82 for direct access of electricity.

Figure 5:
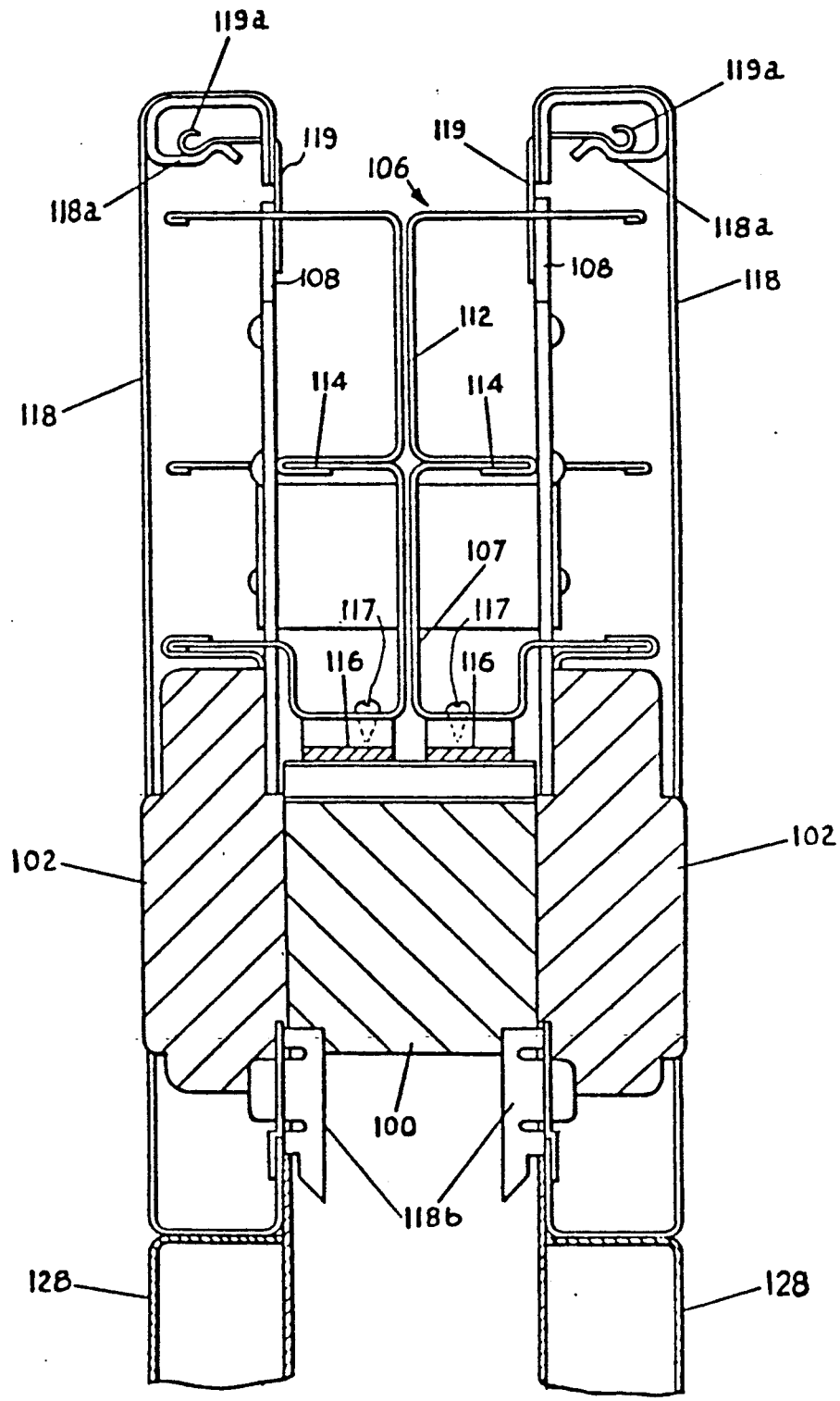
FIG. 5 is a sectional view taken along lines 5—5 of FIG. 3.

Referring now to FIGS. 3 and 5, waistline service chase 106 has a lower section 107 and an upper section 112. A bracket 108 is secured to the ends of the lower section 107 and is secured to the midpoint of the frame through screws 110. A cover-retaining flange 119 extends upwardly from the bracket 108 and forms an outwardly-extending spring retainer 119a at an upper end thereof. The upper section 112 is secured to the lower section 107 through crimped flanges 114. A U-shaped mounting bracket 116 is secured to the lower section 107 through screws 117 and mounts a double-sided energy distribution block 100 through screws (not shown). The upper and lower sections of the beltline service chase 106 form open-sided U-shaped channels to provide a channel for communication wiring above a work surface. A flat electrical cable or festoon 98 is positioned beneath the waistline chase 106 and connects to the energy distribution block 100 through a connector 104. As in the baseline energy distribution system, a convenience outlet 102 can be plugged into each side of the energy distribution block 100. As seen in FIG. 5, the waistline service chase 106 is sufficiently narrow to allow two of such chases in back-to-back relationship. However, a waistline service chase need not be secured in back-to-back relationship and typically will not be. In the typical case where only one waistline service chase is provided on a frame, the energy block 100 can be somewhat narrower and a tile is provided on the opposite side of the frame in lieu of the waistline wire management assembly 28.

A cover 118 has a flat outer face with openings aligned with convenience outlets 102. The cover extends inwardly at top and bottom portions. A U-shaped retaining clip 118a is mounted to the upper, outer portion of cover 118 in registry with the spring retainer 119a. A hook clip 118b is mounted to the lower, outer portions of cover 118 in registry with a keyhole slot 58 on one frame vertical member 42 and with a square opening 60 on an opposite frame vertical member 42. The hinge cover 118 is mounted to the frame vertical members through the hook clips 118b at the bottom and through the U-shaped retaining clips 118a at the top thereof. Two hook clips 118b, one mounted in the keyhole slot 58 on one side of the frame 40 and another in the slot 62 on the other side of the frame 40 (see FIG. 3) provide a hinge point for rotation of the cover 118 with respect to the frame 40.

A half-tile 128 is mounted to the frame 40 beneath the waistline wire management assembly 28 and above a full sized tile 30. The half-tile 128 is typically of the same finish as the cover 118 and can be mounted to the frame in the same manner as the tiles 30. The half-tile 128 and the cover 118 together have a height equal to a full-size tile 30.

The manner of removably securing the tiles 30 to the frame 40 is shown in FIG. 4 in which a portion of the vertical frame member 42 and the tile 30 is removed. Each tile 30 has a pair of hook-shaped clips 68 secured to a bottom portion thereof in spaced relationship at opposite sides of the tile. The clips 68 project rearwardly from the tile 30 and are located to register with a keyhole slot 58 and a rectangular opening 62. The tile 30 further has mounted thereto a pair of rearwardly-projecting spring clips 69 which are spaced apart on opposite sides of the tile 30 to register with a set of square holes 60 in the frame vertical members 42. The spring clips 69 are flexible in a vertical direction to squeeze through the square holes 60 and lodge behind the edges of the opening 60 as illustrated in FIG. 4. Thus, the tiles 30 are easily mounted on the frame 40 by placing the hook-shaped clips 68 in the keyhole slot 58 and rectangular opening 62 while tilting the tile 30 outwardly at an acute angle to vertical so that the slot 58 and opening 62 are visible during this operation. The tile is then rotated toward the frame 40 about a horizontal axis until the spring clips 69 pass through and are lodged behind the openings 62. The tiles 30 are easily removed by following the reverse procedure. The novel system of mounting the tiles 30 to the frame 40 permits the tiles to be removed independently without removal of adjacent or higher or lower tiles and without the use of any tools. Yet, precise spacing is maintained between all panels due to the clips 68 and the keyhole slot 58.

The structure for mounting the tiles 30 to the frame 40 can also be used for mounting the marker or chalkboard tile 30a, the light tile 30b, the wood veneer tile 30c, the clear tile 30d and the curved tiles 32 to the frames 40. All of these tiles have rearwardly-projecting hook-shaped clips 68 and spring clips 69 for ease of mounting and dismounting these tiles in a desirable array at will. With the ease of mounting of the functional and decorative tiles to the frame and removing these files from the frame 40, construction, rearranging and redesigning the work space is greatly facilitated. These tile placement and rearrangement operations can be carried out without specialized expensive labor and perhaps even by the occupant of the work space.

Each of the walls are constructed by first selecting frames 40 of the height and width desired in the final walls. The frames 40 are then rigidly secured together. Wire management functions are determined and appropriate wire management modules are then secured to the frames. The particular functional and decorative tiles are then selected to suit the workspace and exterior wall requirements. The tiles are then placed in the desired locations on the frames. The frame heights differ from one another only in modules of the height of the tiles. Thus, above the bottom wire management cover 82, the height of the frame is an integer, i.e., 2, 3, 4, 5 or 6 of the height of the tiles 30.

Figure 6:
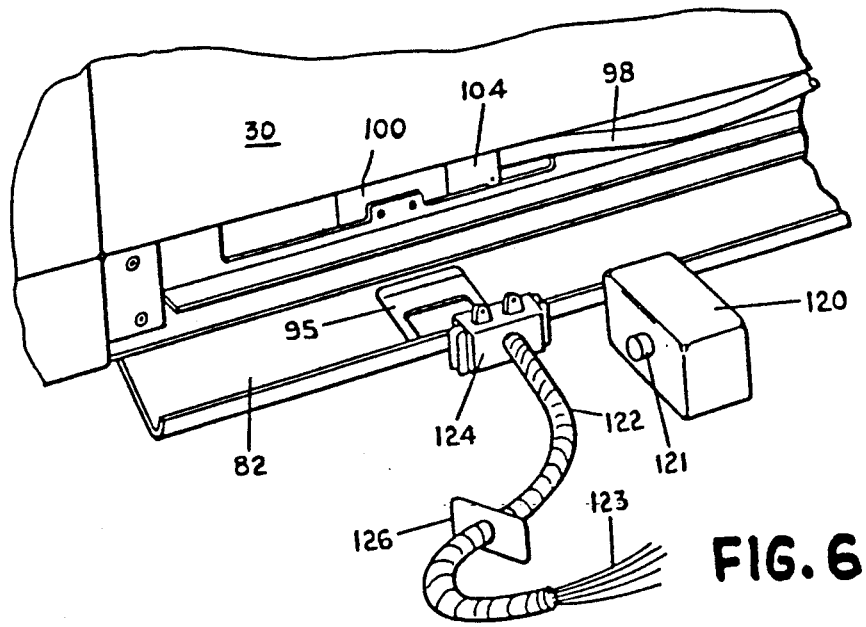
FIG. 6 is a perspective view of a bottom of a panel showing the electrical service to the panel through a monument.

Referring now to FIG. 6, a monument 120 has an outlet opening 121. A flexible cable 122 having wires 123 extends into the opening 121 for connection to an electrical power source at one end thereof and is connected at the other end thereof to a power block 124. The power block 124 is positioned behind an opening in the access cover 95 of the hinged cover 82 and a filler plate 126 covers the opening in the access cover 95.

Referring now to FIG. 7, there is shown a ceiling grid work 130 which supports ceiling panels 132. An opening 134 is provided in a ceiling panel 132 and a power-pole conduit 142 extends through the opening 134 and down through the corner of walls 16. An electrical conduit 136 supplies electricity to a junction box 138. A flexible conduit 140 carries electrical wire down through the power-pole conduit 142 and beneath the waistline chase 106. The electrical wire is connected to the energy distribution block 100 beneath the chase 106.

Referring to FIG. 8, there is shown a schematic view of a cross-section through a U-shaped wall section at a baseline thereof. The cross-section through a waistline would be similar. The electrical cabling 98 is shown passing around the vertical frame members 42 at the edges of the panel but behind the covers 82. The electrical cabling also passes around the corners at the inside corners thereof and is covered by a corner cover member 146. Flexible covers 148 extend between the chases to cover the wiring there between. The covers 148 are U-shaped and are removably secured to the covers 82 (and to waistline covers 118) through a snap-fit connection to be flush therewith. These covers 148 are also illustrated in FIG. 2.

The frames are rigidly connected together to form either straight lines or curved configurations. Any suitable frame-joining technique can be used. Examples of suitable techniques for joining the frames together are disclosed in the Propst et al U.S. Pat. No. 3,430,997 (issued March 4, 1969), U.S. Pat. No. 3,425,171 (issued Feb. 4, 1969, and in the DeFouw et al U.S. Pat. No. 4,571,907 (issued Feb. 25, 1986). These patents are incorporated herein by reference.

Figure 9:
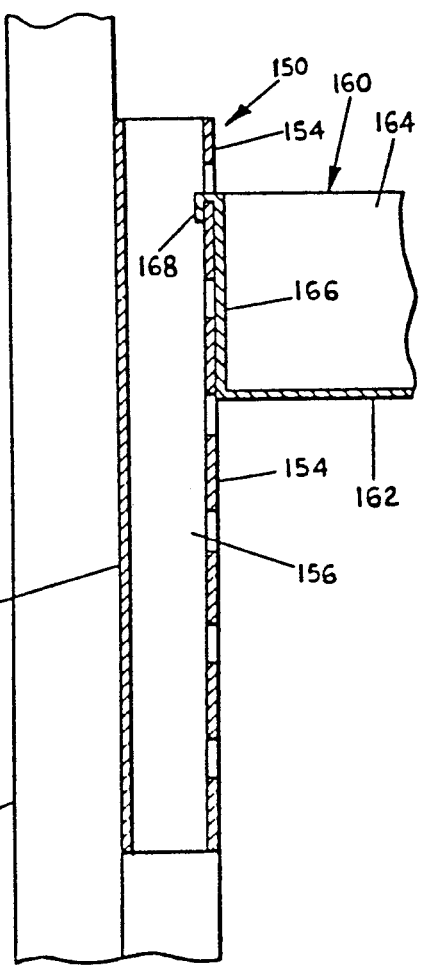
FIG. 9 is a sectional view taken along lines 9—9 of FIG. 2.

Referring now to FIGS. 2 and 9, there is shown a work-in-process rail tile 150. The rail tile 150 has a plurality of vertically spaced horizontal rails 154 for mounting work-in-process items such as trays 160 through depending hooks 168. As seen in FIG. 9, the work-in-process rail tile 150 has a back wall 152, a front wall spaced from the back wall 152 and formed by a plurality of horizontal rails 154. Side walls 156 connect the back wall 152 through the horizontal rails 154. The tray 160 is of conventional shape and has a bottom wall 162, side walls 164, a back wall 166 and a depending hook 168 integrally formed with the back wall 166. The tray 160 is easily positioned on the rails by inserting the hook 168 through an opening between adjacent rails 154 and dropping the tray downwardly so that the hook 168 engages the rail 154. The back wall 166 abuts several rails 154 for stability.

The rails on the tile 150 can take various configurations. A preferred form of a rail tile is disclosed in U.S. Pat. No. 4,618,192, issued Oct. 21, 1986, which patent is incorporated herein by reference.

The removable tiles can perform many different functions. For example, the tiles can have translucent panels in lieu of clear panels and have lighting behind the panels to provide a lighted tile. Alternately, the tile can able a source of illumination. Alternatively, the tiles can be formed as a screen for internal information display with appropriate technology. A tile can be an electronic blackboard. The tiles can be painted or covered with a wood veneer as well as fabric or vinyl. A tile can be formed of a marker board or a chalk board material. The tiles can be adapted to support paper pads. All of these different surfaces are easily constructed and relatively inexpensive to build. They provide the individual user with complete flexibility in design of his or her own work station to fit the tasks as well as to fit the personality of the worker. These options can be selected without special ordering problems. Further, when people are shifted from one location to another, the tiles can be moved easily to a new location and the old location can be easily changed to accommodate the personality and tasks of the new occupant. The walls can also be easily shifted but in any case the tiles can be changed by personnel themselves or with relatively unskilled labor. Since all of the tiles are of a modular size, they are interchangeable and special sizing is not required. Further, the basic underlying frame need not be disturbed during changing of the tiles.

The wire management and tiles 30 are flush with one another to give a clean surface appearance. Yet the flexibility of the wire management allows the wire management to be added at waistline or taken away with great ease and simplicity.

Figure 10:
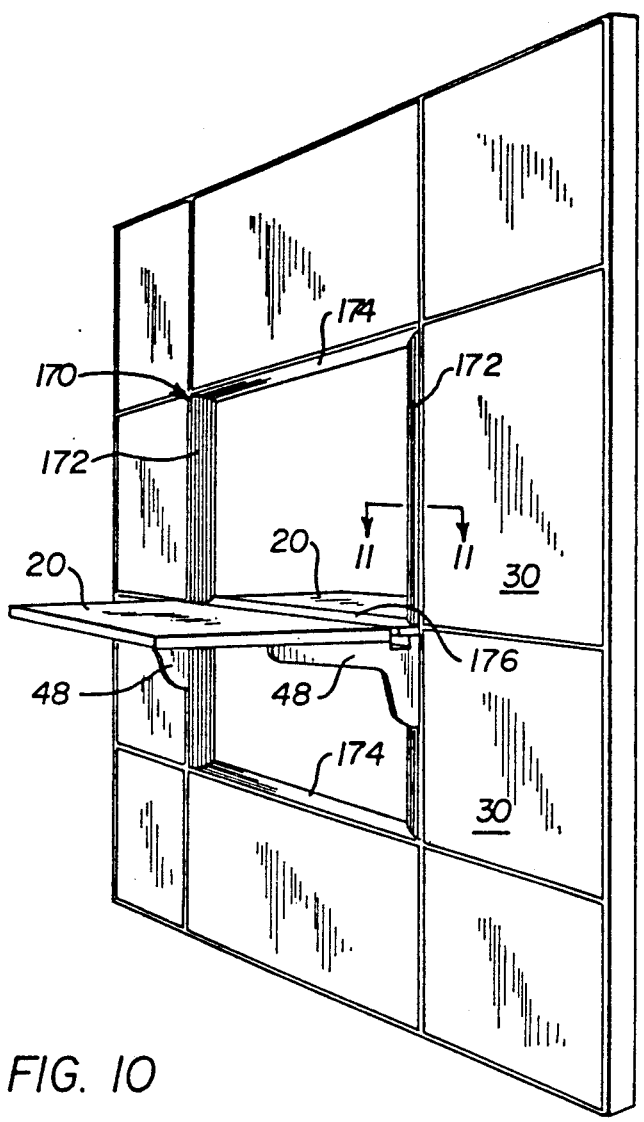
FIG. 10 is a perspective view of a wall panel system according to the invention showing an open tile with pass-through surfaces.
Figure 11:
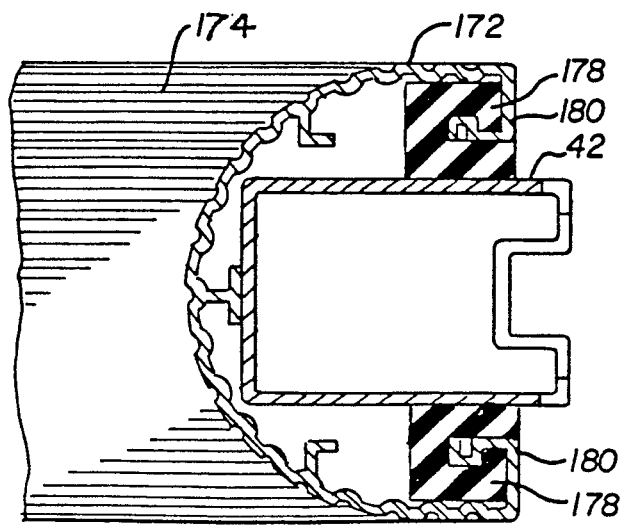
FIG. 11 is a sectional view taken along lines 11—11 of FIG. 10.

Referring to FIGS. 10 and 11, there is shown a wall 16 with an open tile 170 positioned therein adjacent to the tiles 30. The open tile 170 comprises a pair of vertical side posts 172 and a pair of horizontal pieces 174 secured together in spaced-apart relationship by the side posts. The horizontal pieces 174 fit above and below the side posts 172 which are positioned against the vertical members 42 of the frames 40. As shown in FIG. 11, the side posts 172 are hollow and substantially U-shaped, in cross-section. In addition, the side posts 176 are somewhat flexible so that the spacing between legs 176 of the U-shaped side posts can be varied by forcing the legs 176 toward or away from each other. A pair of bumpers 178 are mounted within a pair of substantially C-shaped flanges 180 of the side posts 172. The bumpers snuggly engage the sides of the vertical members 42 of the frame 40 to hold the open tile 170 in position with respect to frames 40. One intermediate horizontal piece 174 fits between upper and lower side posts 172 and beneath a surface insert 176 (shown in FIG. 10) in the same fashion illustrated for the horizontal pieces 174 positioned above and below the side posts 172 shown in FIG. 10. The intermediate horizontal piece 174 is shown in FIG. 11 with the surface insert 176 removed. A work surface 20 can be mounted to the frames 40 through brackets 48 in the manner described above with respect to FIG. 2 adjacent to the surface insert 176 to provide a pass-through surface from one side to the other. Another work surface 20 can be mounted to the open tile 170 on the opposite side of the wall 16. Because the tile 170 is open, it allows workers on opposite sides of the wall 16 to communicate and conduct transactions without having to walk around the wall. Thus, the open tile 170 allows visual communication, as well as air and light through the wall. The open tile also allows for shared use of machinery and work-in-process flow.

Figure 12:
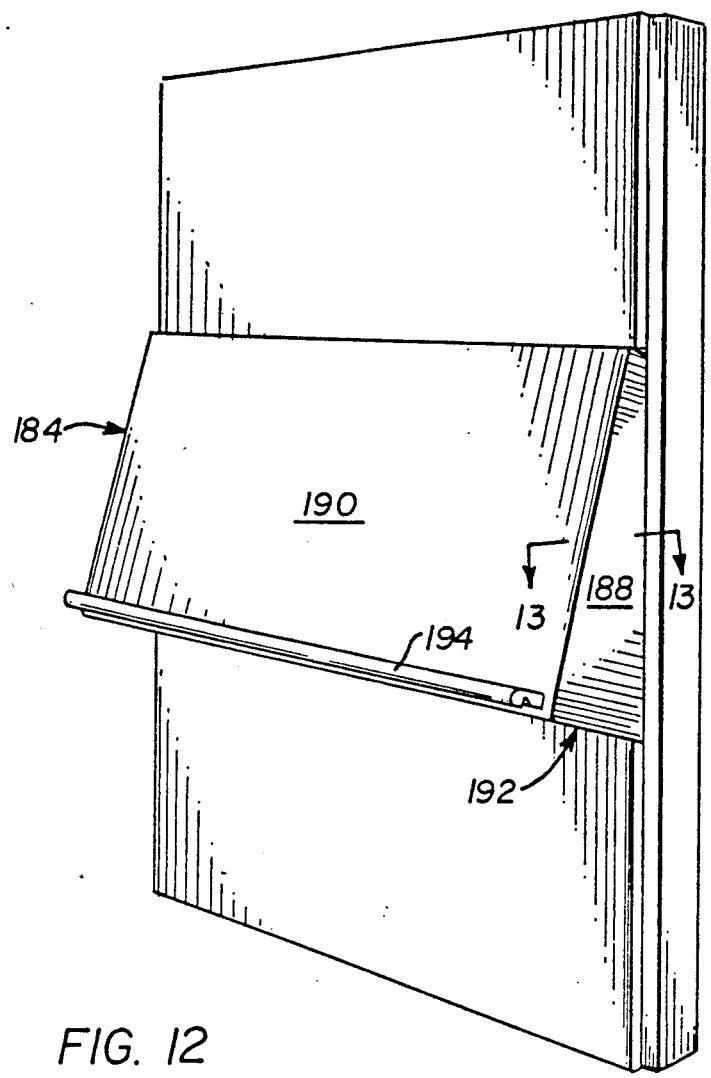
FIG. 12 is a perspective view of a wall panel according to the invention showing a display tile according to the invention.
Figure 13:
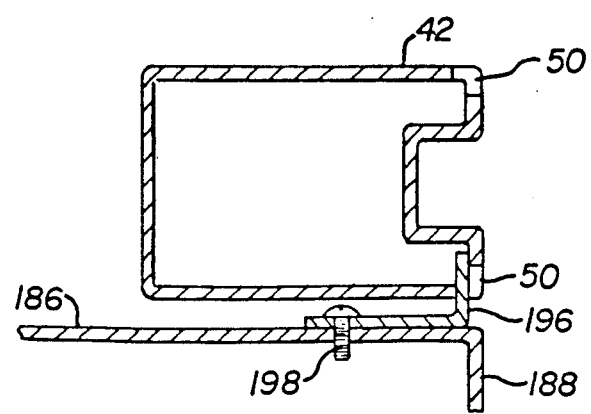
FIG. 13 is a partial sectional view taken along lines 13—13 of FIG. 12.

Referring to FIGS. 12 and 13, a display tile 184 is shown. The display tile 184 is solid and triangular, in cross section, and comprises a back wall 186, a pair of side walls 188, a slanted front wall 190 and a bottom wall 192. The walls are integrally formed together. A horizontal support ledge 194 is mounted to and extends across a bottom portion of the front wall 190.

As shown in FIG. 13 the display tile 184 is supported on the frame 40 through clips 196 which extend into slots 50 in the vertical members 42 of the frame 40. To this end, the clips 196 have hooks identical to the hooks shown on bracket 48 in FIG. 2 and which engage the slots 50 to mount the tile 184 to the frame members 42. One leg of the L-shaped clip 196 extends along the back wall 186 of the tile and is secured thereto through screws 198, only one of which is shown in FIG. 13.

The display tile 184 can be easily mounted on the frame 40 and removed from the frame members 42 through the clips 196. The display tile 184 need only be raised and pulled outwardly to remove the display tile from the wall 16. Antidislodgement devices (not shown) can be used on the clips to prevent inadvertent removal of the display tile 184 and other similar tiles from the wall 16.

Figure 14:
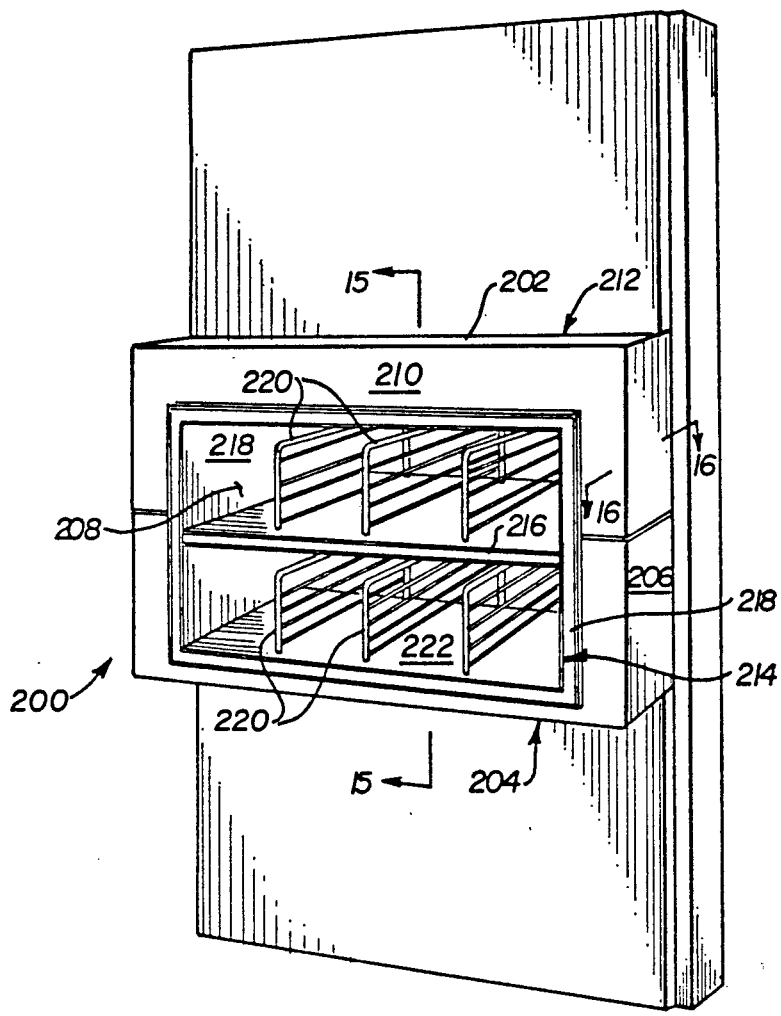
FIG. 14 is a perspective view of a wall panel system according to the invention showing a mail tile.
Figure 15:
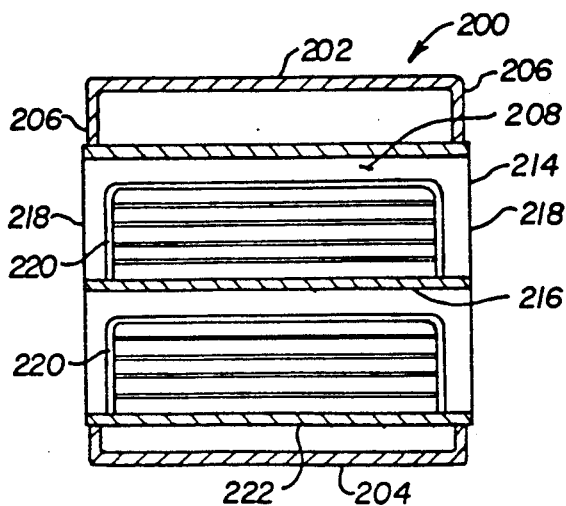
FIG. 15 is a sectional view taken along lines 15—15 of FIG. 14.
Figure 16:
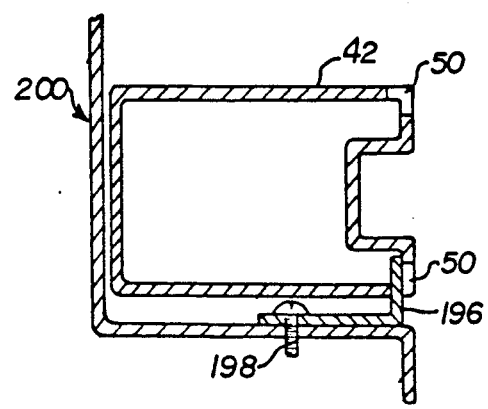
FIG. 16 is a view taken along lines 16—16 of FIG. 14.

Referring now to FIGS. 14–16, there is shown a mail tile 200. The mail tile 200 is a rectangular box-like structure having a top wall 202, a bottom wall 204, side walls 206 and a rectangular passway 208 extending through front 210 and back 212 sides of the tile. A relatively thin-walled rectangular frame 214 is positioned in the rectangular passway 208 of the mail tile 200. The passway 208 is divided into compartments by a central horizontal shelf 216 extending between vertical side members 218 of the rectangular frame 214 and a plurality of spaced apart wire dividers 220 mounted to the horizontal shelf 216 and a horizontal bottom member 222 of the rectangular frame 214.

The mail tile 200 has a depth greater than that of the wall 16 and is mounted to the wall such that part of the tile extends into a work area on one side of the wall and another part of the tile is positioned in, for example, a hallway formed by a number of walls 16. A person in the hallway can fill the compartments of the passway 208 with sorted mail (not shown) which can be retrieved on the other side of the wall 16 in the work area by workers.

Referring to FIG. 16, the mail tile 200 is supported on the frame 40 in the same manner as the display tile is supported on the frame as shown in FIG. 13. That is, the clips 196 are mounted to the tile 200 and are set in registry with the slots 50 in the vertical members 42 of the frame 40.

Figure 17:
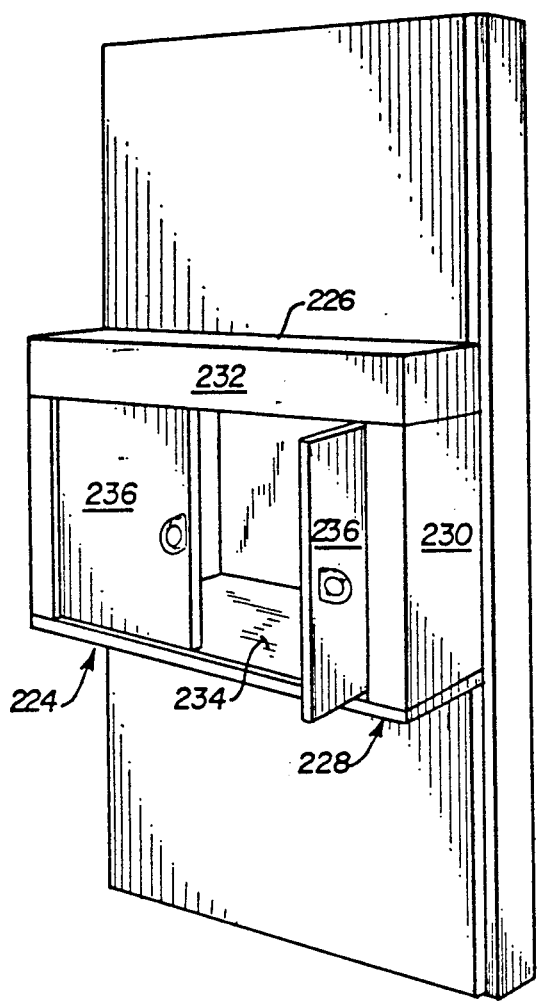
FIG. 17 is a perspective view of a wall panel system according to the invention showing a shared storage tile according to the invention.

Referring now to FIG. 17, there is shown a shared storage tile 224. Like the mail tile 200, when the shared storage tile 224 is mounted to the wall 16, one-half of the tile 224 is positioned on one side of the wall 16 and the other half of the tile is positioned on the other side of the wall. The tile 224 comprises a top side 226, a bottom side 228, a lateral side 230 and a pair of open, longitudinal sides 232. The sides define an interior 234 of the tile 224. Each longitudinal side 232 is closed off by a pair of doors 236 pivotally mounted to the lateral sides 230 of the tile 224 and movable with respect thereto on slides (not shown) slidably received within channels (not shown) on the lateral sides 230. In an open position, the doors 236 can be slidably moved within the tile 224 so that they do not protrude into the work areas on opposite sides of the wall 16. Because access to the interior 234 of the tile 224 can be obtained from both longitudinal sides 232 thereof, workers have access to the interior of the tile from work areas on both sides of the wall. The shared storage tile 224 can be mounted to the frame 40 in the same manner as the display tile 184.

Figure 18:
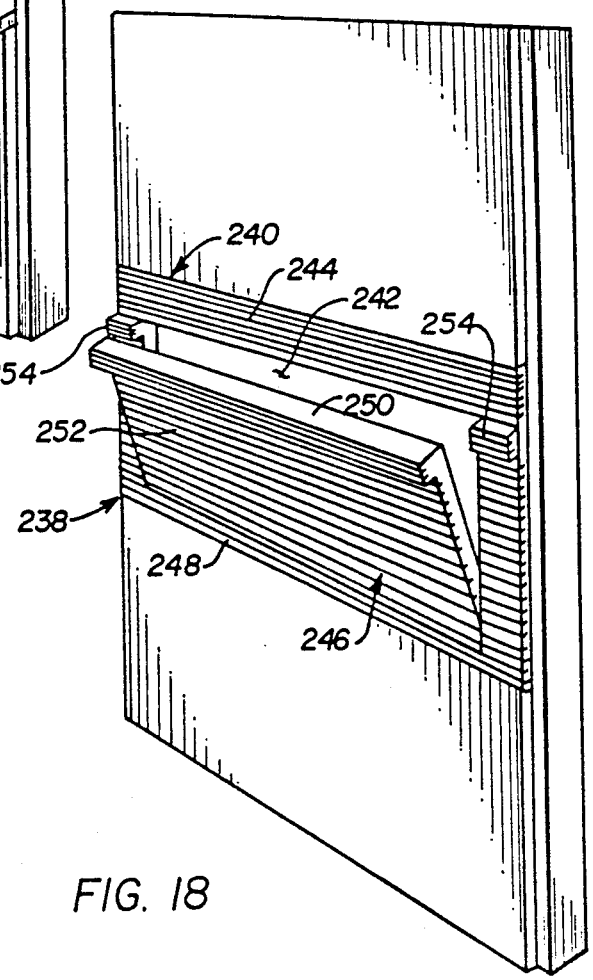
FIG. 18 is a perspective view of a wall panel system according to the invention showing a shelf tile with the shelf in a raised position.
Figure 19:
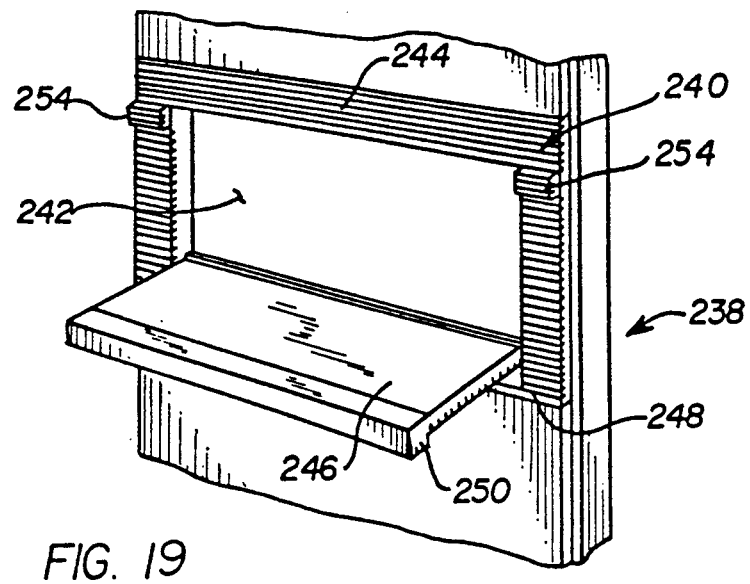
FIG. 19 is a view similar to FIG. 18 but showing the shelf in a perpendicular position.

Referring now to FIGS. 18 and 19, there is shown a wall 16 having mounted thereto a pull down shelf tile 238. This tile comprises a solid rectangular member 240 having a rectangular recess 242 formed in a front 244 of the tile. A rectangular shelf 246 having substantially the same dimensions as the rectangular recess 242 is pivotally mounted within the recess at a bottom 248 of the solid rectangular member 240. The shelf 246 is adapted to pivot between an open position shown in FIG. 19, where the shelf is horizontally disposed and adapted to support a variety of work accessories (not shown) or function as a work surface, and a closed position shown in FIG. 18, where the shelf rests within the recess and is flush with the front 244 of the tile 238. The shelf 246 includes a horizontal, elongated, rectangular bar 250 extending across an upper part 252 of the shelf and which functions as a handle to facilitate pivotal movement of the shelf between the open and closed positions. The tile 238 further includes a pair of relatively short, horizontal, rectangular bars 254, identical to the elongated bar 250 on the shelf 246 except as to length, positioned on opposite sides of the recess 242 and coextensive with the bar 250 of the shelf 246 when the same is in the closed position. In this manner, when the shelf 246 is in the closed position, the bars 250, 254 form a horizontal, decorative lip extending along the full length of the front 244 of the tile 238. The shelf tile 238 can be mounted to the frame 40 in the same manner as the display tile 184.

Figure 20:
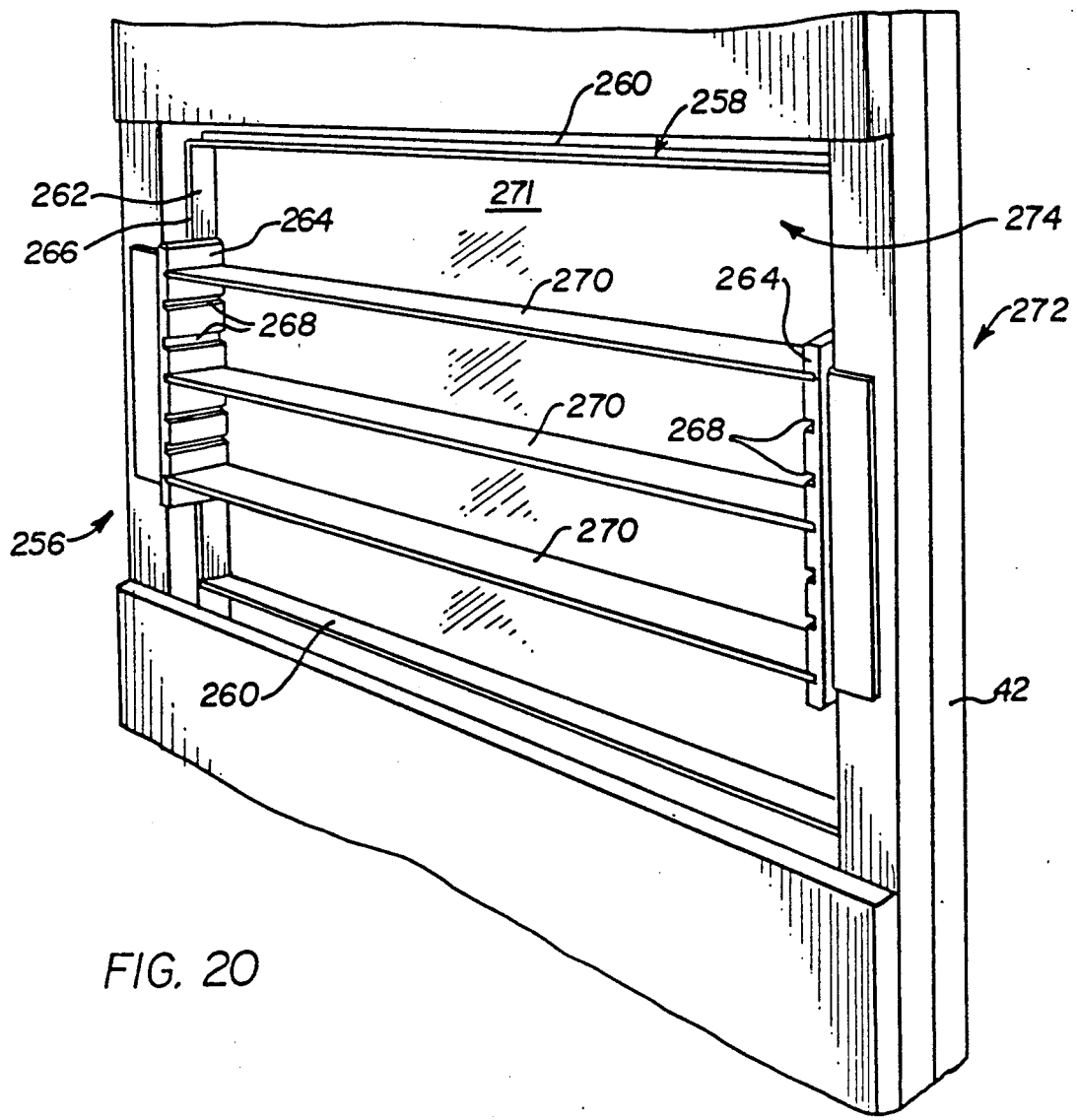
FIG. 20 is a perspective view of a wall system according to the invention showing a trophy tile according to the invention.

Referring to FIG. 20, there is shown a wall 16 incorporating a trophy tile 256. The trophy tile 256 comprises a rectangular frame 258 having pairs of horizontal and vertical frame members 260, 262. A pair of rectangular mounting brackets 264 are mounted to central portions 266 of the vertical frame members 262. The brackets 264 include series of vertically spaced horizontal channels 268. One or more shelves 270 are adapted to slidably and adjustably engage the channels 268. In addition, the shelves 270 are adapted to support trophies (not shown) and the like for display. The tile 256 is partially enclosed by a rectangular sheet of glass 271 mounted to the front 272 of the tile. The glass 271 allows workers in front of the tile to view the display and functions as a sound barrier between areas on opposite sides of the wall 16. The back 274 of the tile is open to permit access to the shelves 270 and trophies supported thereon.

Figure 21:
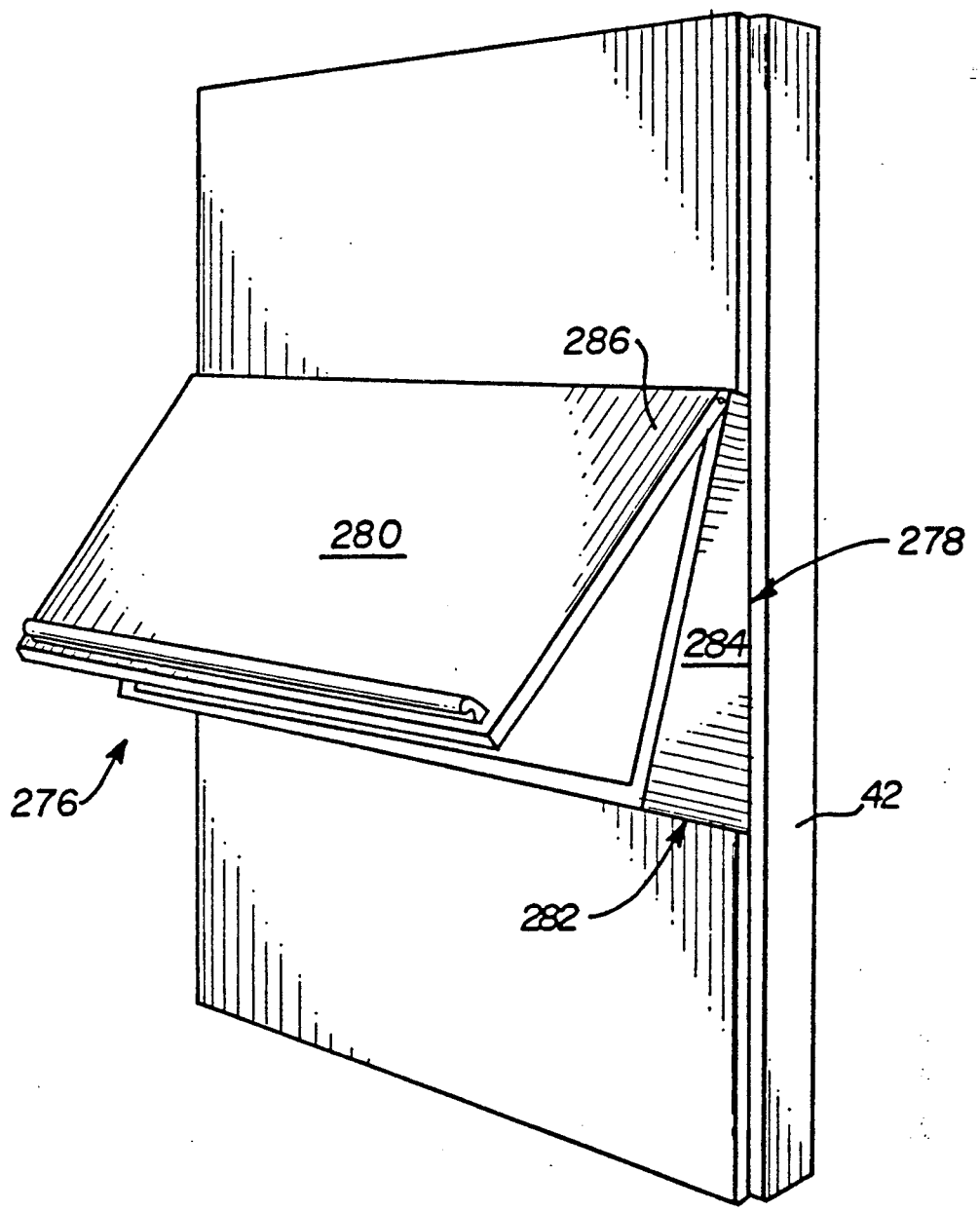
FIG. 21 is a perspective view of a wall system according to the invention showing a storage display tile according to the invention.

Referring to FIG. 21, there is shown a storage display tile 276. The storage display tile is substantially similar to the above-described display tile 184, except that in the former tile 276, a back wall 278, a front wall 280, a bottom wall 282 and side walls 284 of the tile 276 are not integrally formed together as they are in the display tile. Rather, they are separate walls mounted together. Also, the front wall 280 is hingeably mounted at an upper portion 286 thereof to the back wall 278. In this manner, access may be gained to the interior of the tile 276 which can function as a storage area for work accessories (not shown). The storage display tile 276 is mounted to the frame 40 in the same manner as the display tile 184. The back wall of the storage display tile 276 can extend into the open area of the frame 40 or extend along the face of the frame 40 as does the display tile 184.

Figure 22:
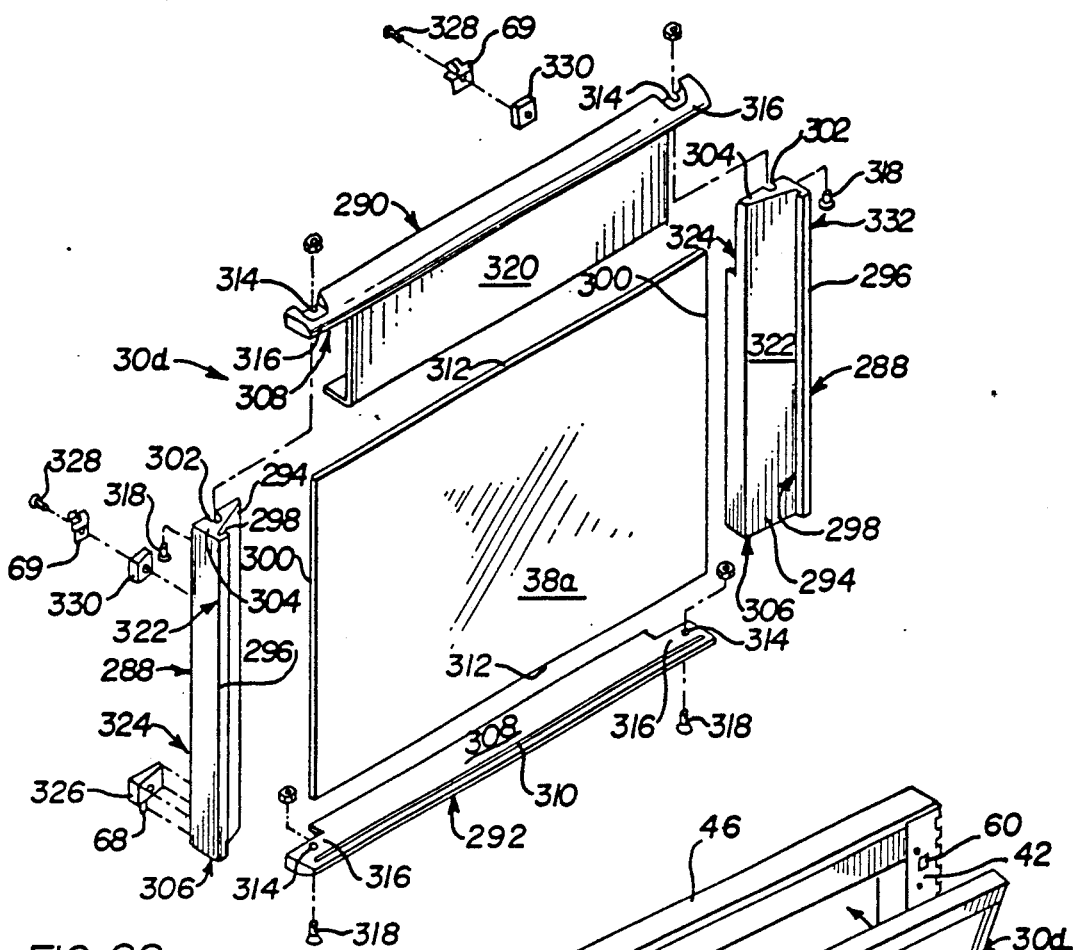
FIG. 22 an exploded view of a window tile accordingly to the invention.

FIG. 22 illustrates, in detail, the construction of the window tile 30d previously described with reference to FIG. 2. The casement 38 comprises a pair of vertical side stiles 288 and a pair of upper and lower rails 290, 292. Each stile 288 is somewhat L-shaped, in cross section, and has an inwardly-extending leg 294, a forwardly-extending leg 296 and an elongated channel 298 formed at the juncture between the legs 294, 296 and extending along the full length of the stile. Transverse side edges 300 of the pane 38a are positioned in registry with the channels 298 to provide a secure mounting of the pane 38a to the stiles. The stiles 288 further include pairs of slots 302 extending through upper and lower axial ends 304, 306 of the stiles and which function to secure the rails 290, 292 to the stiles as will be discussed below.

It should be noted that the stiles 288 can be equipped with a means for preventing lateral movement of the pane 38a within the channels 298 and thus rattling of the pane with respect to the stiles. For example, a foam strip (not shown) can be positioned in the channels 298 so that the side edges 300 of the pane 38a rest against the foam to prevent such movement and rattling.

The pane 38a is positioned in front of the inwardly-extending legs 294 of the stiles. By this design, when the window tile 30d is mounted to the frame 40, the legs 294 are disposed in overlapping relationship to the vertical members 42 of the frame so that the same is not visible through the clear or translucent pane 38a. In this manner, functional, relatively unattractive features of the vertical members 42, such as the keyhole slots 58, are not seen from a position in front of the tile.

The upper and lower rails 290, 292, include, on opposing faces 308 thereof, grooves 310 extending along substantially the full length of the rails. Longitudinal side edges 312 of the pane 38a are positioned within the grooves 310 to provide a mounting of the pane to the rails 290, 292. Like the stiles 288, the upper and lower rails 290, 292 can be provided with a means to restrict lateral movement of the longitudinal side edges 312 of the pane 38a with respect to the grooves 310 and thus prevent rattling of the pane with respect to the rails. Thus, the rails can be equipped with the foam strips (not shown) positioned within the grooves, as stated above with respect to the channels 298 of the stiles 288. Alternatively, a pressure-sensitive adhesive (not shown) can be molded within the grooves to prevent lateral movement and thus rattling of the pane 38a.

The rails 290, 292 further include pairs of openings 314 extending through opposite transverse ends 316 of the rails and positioned in registry with the slots 302 in the stiles 288. Bolts 318 extend through aligned pairs of openings 314 and slots 302 in the rails and stiles to securely mount the same together to form a rigid framework or border 38 for the pane 38a.

As shown in FIG. 22, the upper horizontal rail 290 can include an apron 320 formed integral with or rigidly secured to the rail 290, positioned rearwardly of the groove and extending downwardly from the face 308 of the rail. In this manner, the pane 38a is positioned in front of the apron 320. An upper horizontal rail 290 having an apron 320 is utilized in connection with the window tile when it is desired to mount the tile 30d to the frame 40 as the uppermost tile mounted to the frame. When the tile 30d is so mounted, the apron 320 extends downwardly in front of the upper horizontal frame member 44 of the frame 40 so as to cover the same from view from a position in front of the tile 30d. When it is desired to mount the window tile 30d to a central or lower portion of the frame 40, an upper horizontal rail 390 without an apron 320 is used because such portions of the frame 40 are not associated with horizontal frame members 44, 46.

The window tile 30d is adapted to be easily and removably mounted to the frame 40 and to this end, as stated above, the window tile has a pair of the rearwardly-projecting, hook-shaped clips 68 and a pair of the spring clips 69. The hook-shaped clips 68 are adapted to be set in registry with a keyhole slot 58 and a rectangular opening 62 in the frame members 42, and the clips 69 are adapted to be set in registry with a pair of square holes 60 in the frame members 42. Specifically, the hook-shaped clips 68 are securely attached to the bottom transverse ends 322 of the stiles, on the rear surfaces 324 thereof. Preferably, the hook-shaped clips 68 are formed integral with lower wedges 326 adhesively attached to the bottom ends 322 of the stiles 288. Alternatively, the hook-shaped clips 68 can be formed integral with the stiles 288. The spring clips 69 are preferably mounted, as by screws 328, to a pair of upper wedges 330 adhesively attached to upper transverse ends 332 of the stiles 288. In an alternative embodiment of the window tile 30d, the clips 69 can be mounted by screws 328 to bosses (not shown) integrally formed with the stiles 288.

Figure 23:
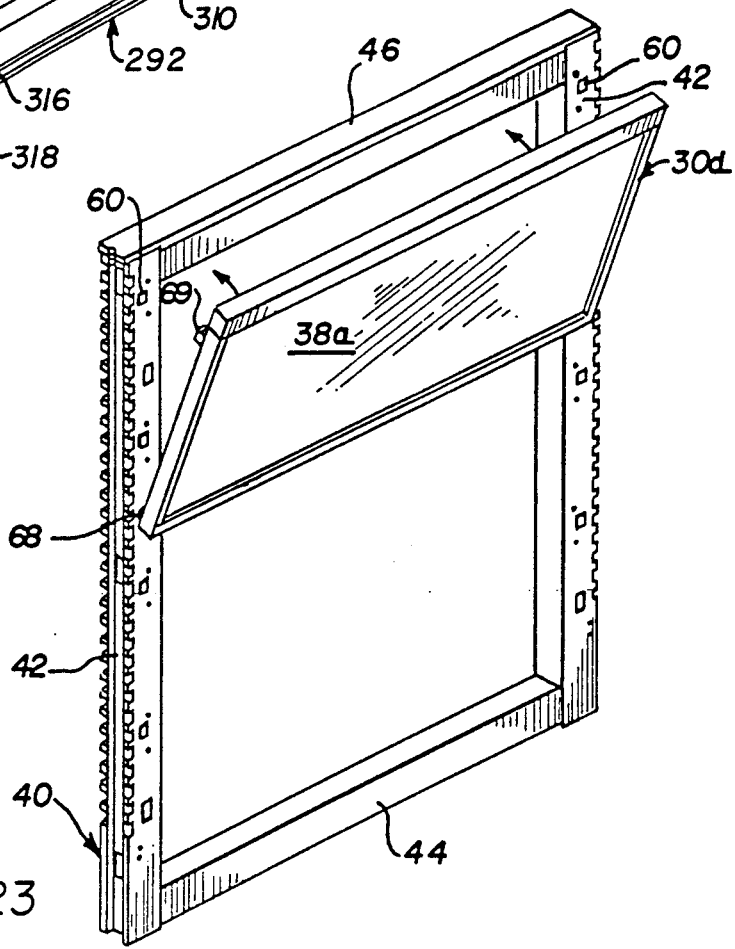
FIG. 23 is a schematic view of a frame and window tile showing the ease of mounting and removing of the window tile from a frame number.

The manner of removably mounting the window tile 30d to the frame 40 is illustrated in FIG. 23. As stated above generally with respect to the mounting of the tiles 30 to the frame 40, the lower hook-shaped clips 68 of the tile 30d are first set in registry with a keyhole slot 58 and a rectangular opening 62 while tilting the tile 30d outwardly so that the slot 58 and opening 62 are visible during this operation. Subsequently, the tile 30d is rotated toward the frame 40 until the spring clips are passed through and lodged behind the square holes 60. The tile 30d is easily removed by following the foregoing steps, but in the reverse order.

Figure 24:
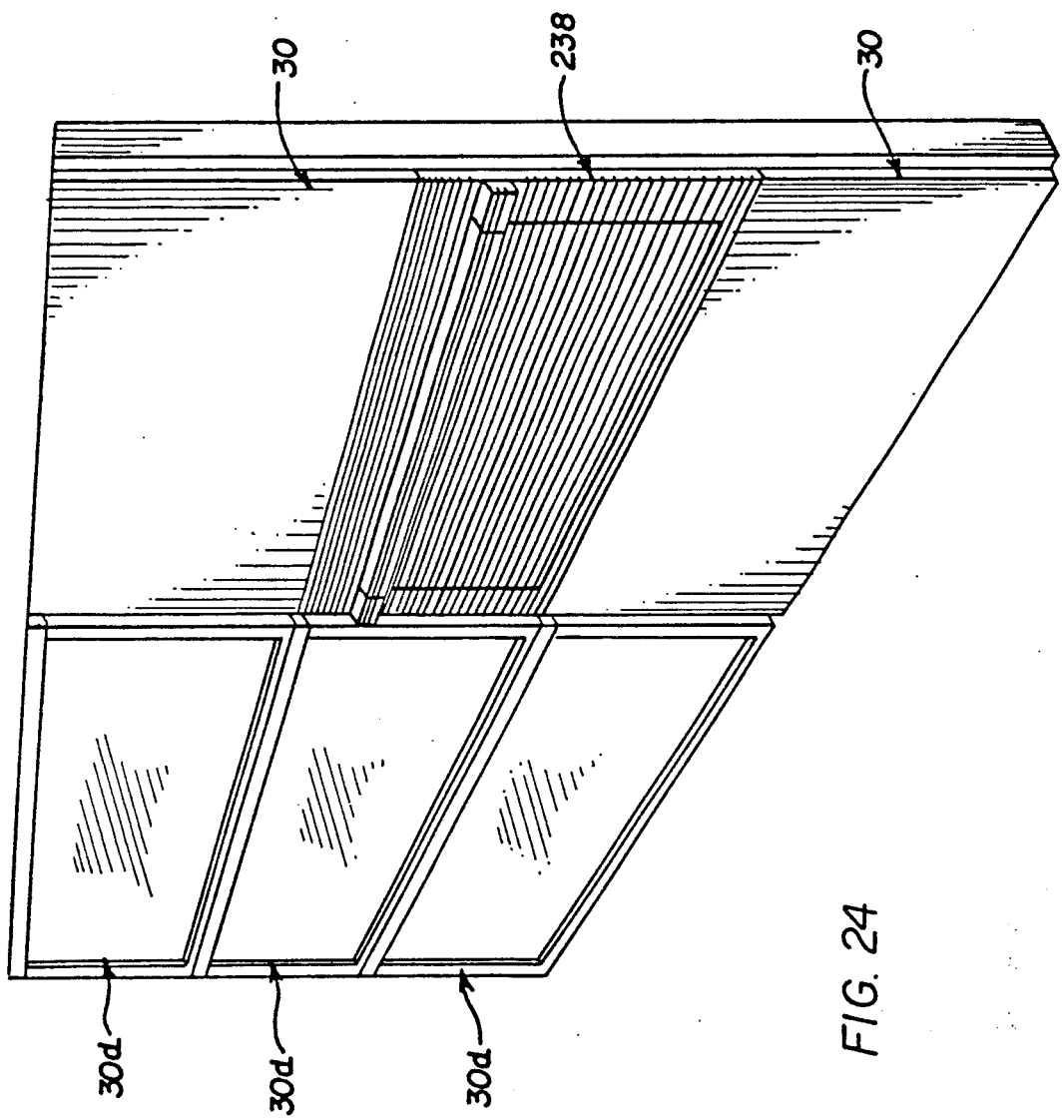
FIGS. 24-26 are plan views of wall systems according to the invention illustrating the interchangeability of the functional and decorative tiles according to the invention.
Figure 25:
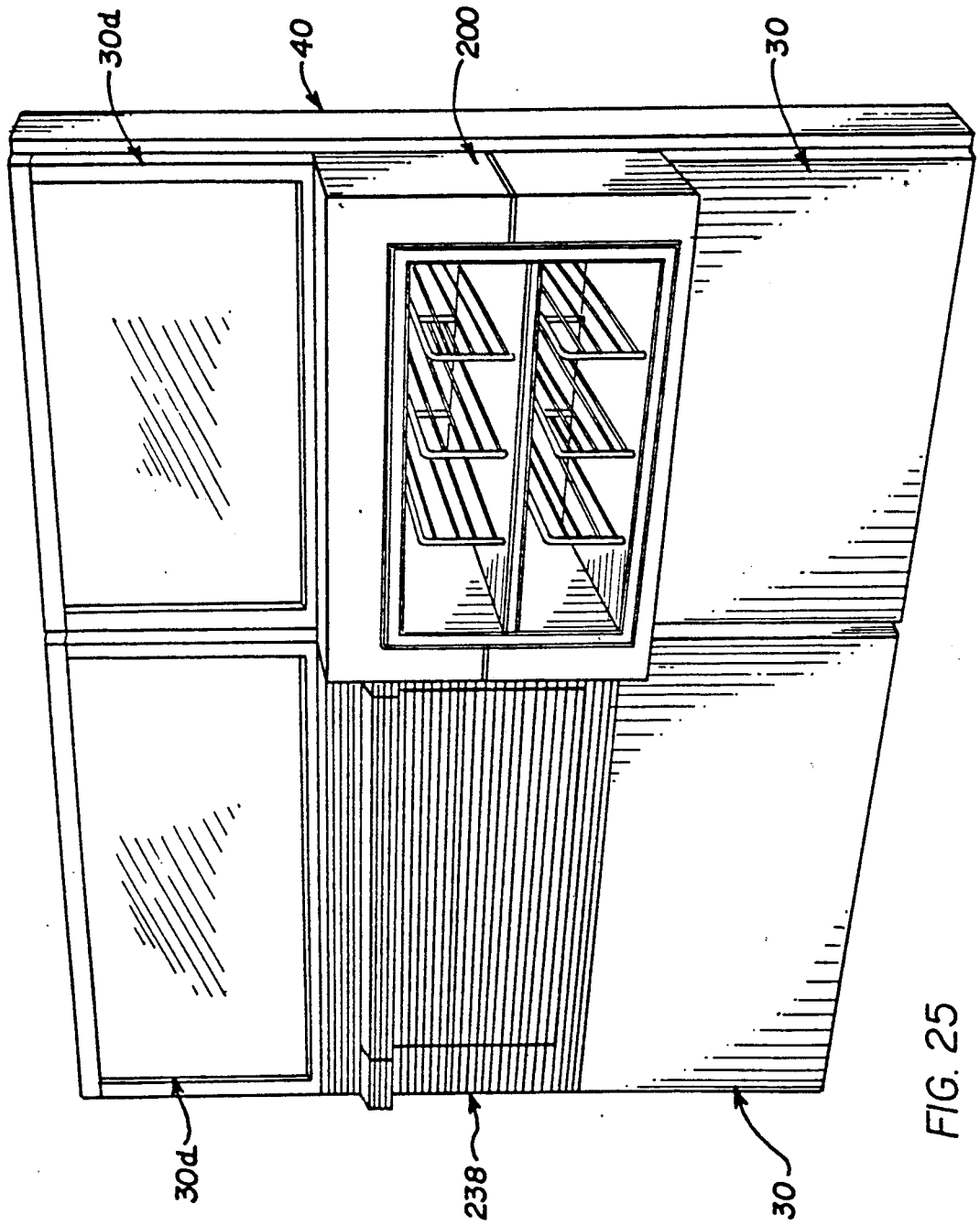
Figure 26:
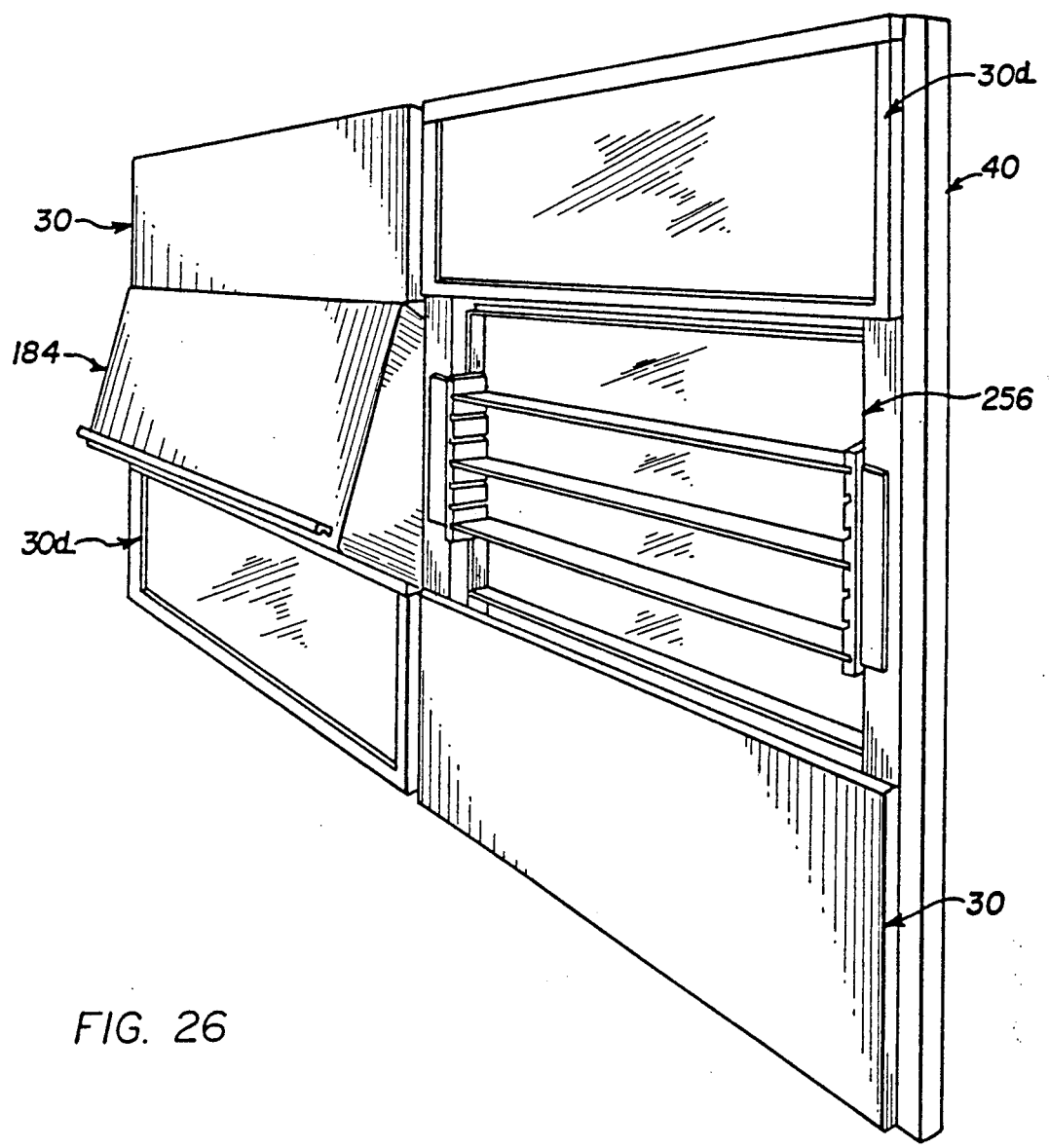

Due to the fact that all of the decorative and functional tiles are easily removably mounted to the frames 40 by following the above-described installation and removal procedures, the tiles mounted to the frames can be rearranged to accommodate workers of varying physical stature and to create a variety of work area organizational schemes. This rearrangement feature of the tiles is shown in FIGS. 24–26, where a frame 40 is illustrated as having six decorative and functional tiles mounted thereto, with the six tiles varying in type in the different figures. For example, FIG. 24 illustrates a frame 40 having mounted thereto a series of three window tiles 30d stacked one on top of the other on one side of the frame 40. In addition, a pull-down shelf tile 238 is mounted to a central portion of the frame on the other side of the tile, with two decorative, solid, opaque tiles 30 positioned above and below the shelf tile. FIG. 25 illustrates a frame 40 having mounted thereto a pair of window tiles 30d at an upper portion of the frame, a pair of solid, decorative, opaque tiles 30 positioned at the bottom of the frame and a pull-down shelf tile 238 and a mail tile 200 at the central portion of the frame. In FIG. 26 the frame 40 has mounted thereto a pair of solid, opaque tiles 30 at opposite upper and lower corners of the frame, a pair of window tiles 30d mounted to upper and lower corners of the frame opposite the solid tiles and display and trophy tiles 184, 256 mounted to the central portion of the frame 40.

Figure 27:
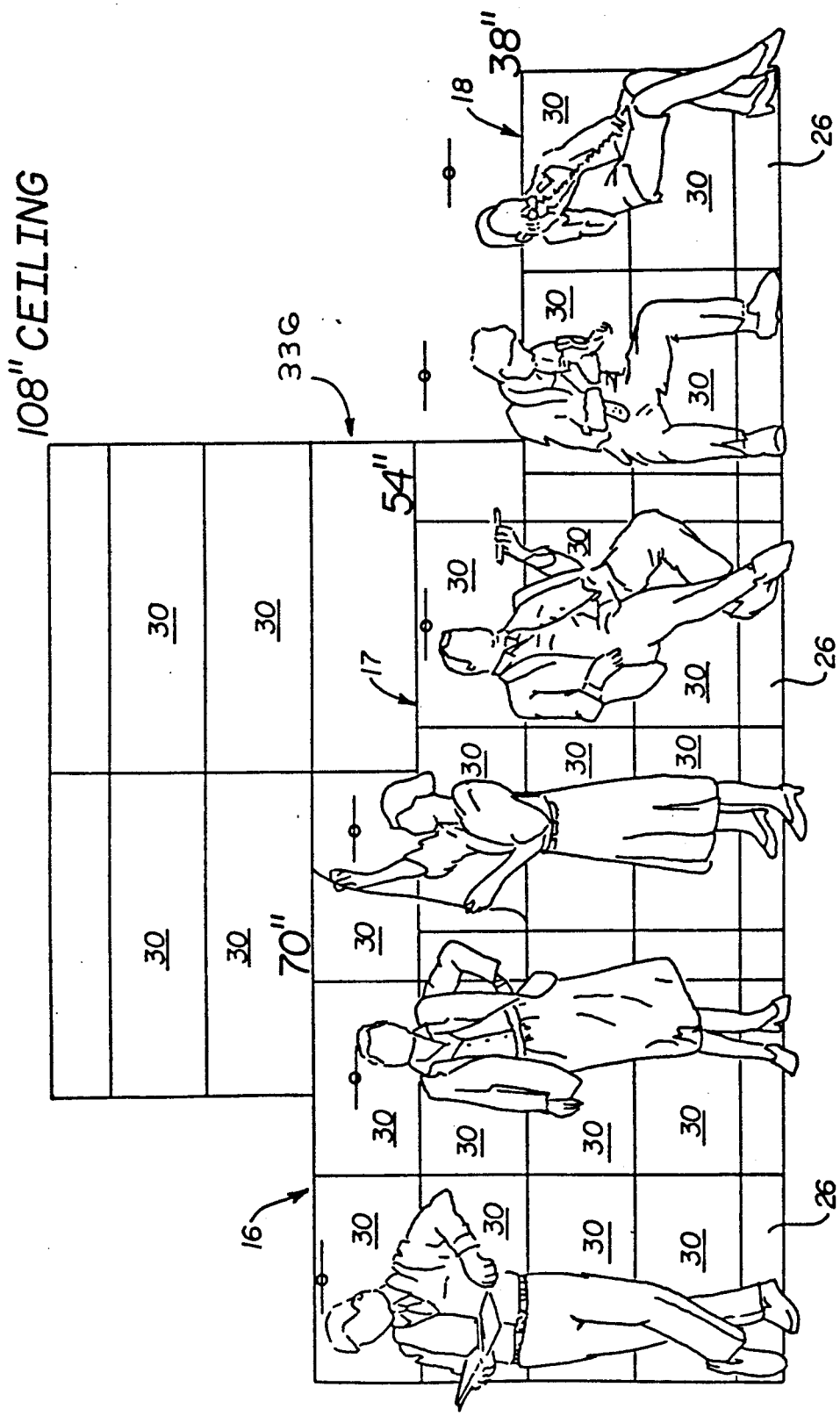
FIG. 27 is an elevational view a wall system according to the invention showing different height walls and their relationships to various functions performed by workers in the space defined by the walls.

FIG. 27 shows how the wall heights dictated by the tile modules relate to various functions performed within the work space. The short wall 18, formed by a baseboard wire management assembly 18 and two tiles 30 in vertical juxtaposition, provides a partial enclosure but allows the functions of seated communication with persons outside the wall 18 and material work flow. Intermediate wall 17 formed of a baseboard wire management assembly 26 and three tiles 30 in vertical juxtaposition, provides a partial enclosure for seated privacy. A standing height wall 16, formed of a baseline wire management assembly 26 and four tiles 30 in vertical juxtapoistion, provide for standing privacy. A full height, floor to ceiling wall 336, formed of a baseline wire management assembly 26 and six or more tiles 30, provides a full enclosure and complete privacy. This figure illustrates the functional modularity of the stepped walls of work space management system according to the invention.

Figure 28:
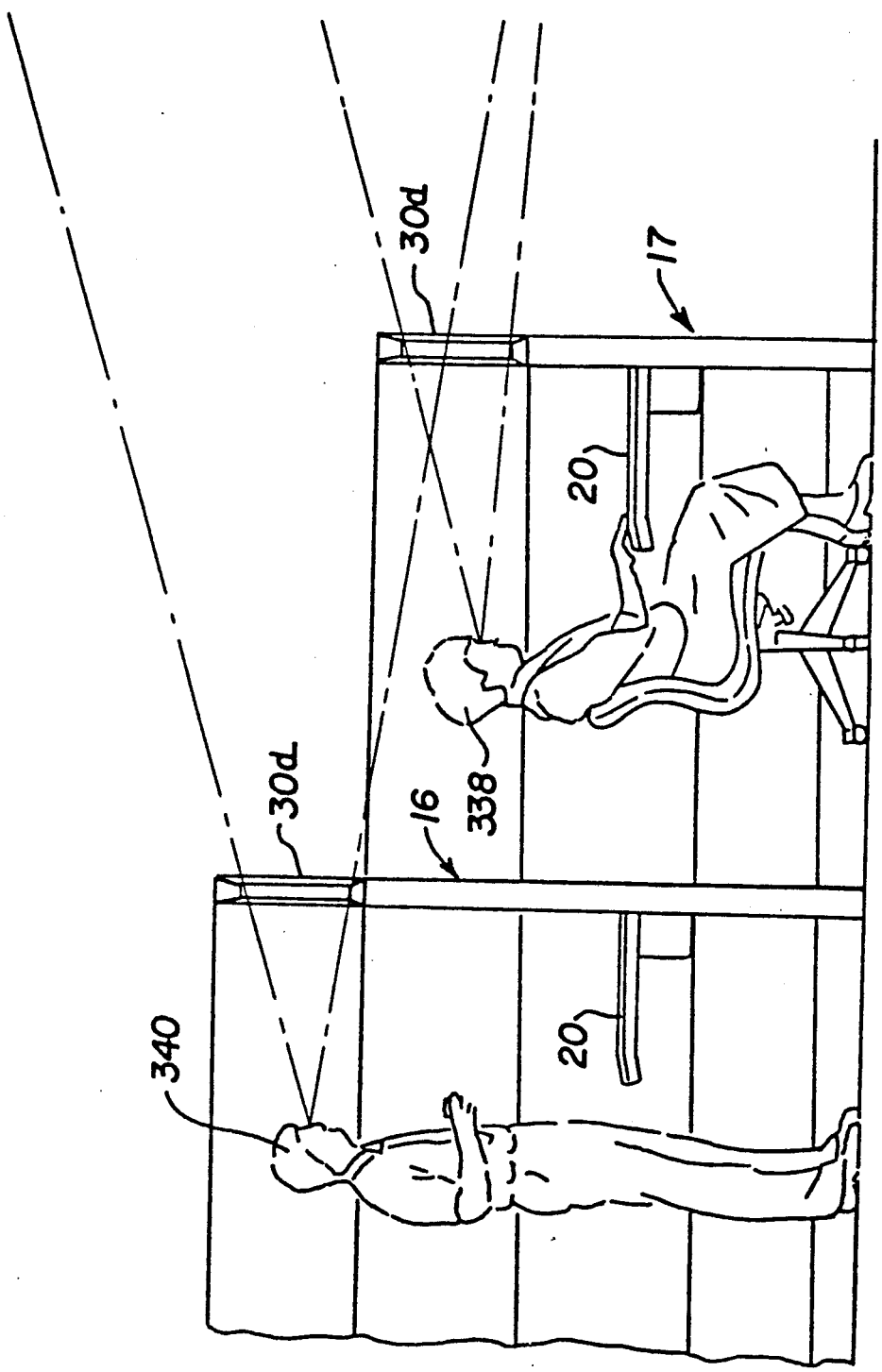
FIG. 28 is another elevational view of wall system according to the invention illustrating the visual relief and light porosity achieved by the invention.

FIG. 28 illustrates how window tiles 30d in various wall sizes give visual and light porosity to walls and give workers eye relief without interfering with the structural or functional integrity of the walls. A worker 338 is seated at a work surface 20 in front of an intermediate size wall 17 having a window tile 30d. The worker can look directly through the window tile 30d in the wall 17 for visual contact with the space outside the wall 17. Yet the window tile 30d does not interfere with the functional or structural integrity of the wall 17.

In like manner, a worker 340 stands before a higher wall 16 which has a window tile 30d at an upper level thereof. The worker 340 can look through the window tile 30d in the wall 16 and has a clear view outside the wall 16. Further, the worker 340 can look over the top of this intermediate wall 17 as well as through the window 30d in the wall 17. The window tiles 30d thus give a visual and borrowed light porosity to the wall structure without interfering with the structural or acoustical integrity of the walls.

The concept of hanging decorative and functional tiles onto the frames provides a system in which a wall system can be inexpensively manufactured, yet the wall system has the appearance i.e. thickness, of an architectural wall, that is, a wall which has been constructed in the conventional fashion with studs. Further, the thickness of the wall and the tiles allows wiring to be passed through from wall section to wall section around the frames without the necessity of feeding the wires through the frames. This lay-in capability is important in installing and changing the communications and electrical wiring quickly and easily with relatively unskilled labor.

Thus, the work space management system according to the invention provides an easy means for linking a diverse range of office workers with electronic equipment and databases. The flexibility of the wire management, both at the baseline and selectively at the waistline with lay-in capabilities and wiring around the frames, provides this ability. As indicated, the lay-in capabilities provide for an ease of installation, adaptability of change with a minimum of effort and the communication wiring is delivered to a convenient location, i.e. at work height.

The ease of removability of the tiles as well as the modularity of the tiles and the functional variety of the same provides a way to manage the office space system in terms of specification, design and installation. The variety and modularity of the tiles as well as the ease with which these tiles are installed and removed from the rigid frames provide a solution to meeting individual needs in work areas and a balance between privacy and communication. The invention provides a way in which a modern VDT-containing work station can easily adjust to the physical as well as psychological needs of the individual worker and serve as a buffer between him or her and inflexible computer hardware.

The invention provides a way in which each work station can be customized to individual needs on a convenient and economical basis. The tiles provide the functional as well as decorative support, are relatively inexpensive to construct and to order and can be easily changed to suit changing functions or changing tastes.

In addition, the invention provides a system for attaining a desired degree of porosity in an open plan wall system. The window tiles and the open tiles provide the porosity to the walls for the degree of openness desired, without interfering with other functional necessities of the workplace.

Reasonable variation and modification are possible within the scope of the foregoing disclosure and drawings without departing from the spirit of the invention which is defined in the appended claims.

The embodiments of the invention in which an exclusive property or privilege is claimed are defined as follows:

1. A work space management system for dividing a space into separate work areas comprising:
   a rigid structural framework formed of rigid structural rectangular frames rigidly joined together at the edges thereof to form at least one work area;
   each of said frames having outer faces on opposite sides thereof and receiving means on said opposite sides of said frames, said tile-receiving means comprising openings in the face of said frames;
   a plurality of interchangeable tiles having an attaching means cooperating with said receiving means on said frames for removably mounting said tiles to said frames for ease of placement on and removal from said frames, said attaching means on said tiles comprising projections which fit within said openings;
   said tiles being mounted to the outer faces of both sides of said frames in juxtaposed parallel relationship;
   said tiles having a width substantially equal to the width of the frames to which said tiles are mounted and have a height such that at least two of said tiles are mounted in vertical juxtaposition on each of said frames;
   some of said tiles having a decorative surface and other of said tiles having a structure to serve a function other than decorative in the work area defined by said framework and tiles;
   whereby said tiles, whether decorative or functional, can be selectively interchanged easily and quickly with tiles mounted within the same frame or with tiles mounted on different frames within the system.

2. A work space management system for dividing a space into separate work areas comprising:
   a rigid structural framework formed of rigid structural rectangular frames rigidly joined together at the edges thereof to form at least one work area;
   each of said frames having outer faces on opposite sides thereof and receiving means on said opposite sides of said frames;
   a plurality of interchangeable tiles of relatively equal modular size and substantially common height, with each of said tiles having an attaching means cooperating with said receiving means on said frames for removably mounting said tiles to said frames for ease of placement on and removal from said frames;

attaching means comprising a spring clip for engaging said receiving means on said frame, whereby said tile can be removed at least in part by pulling outwardly on said tile and mounted at least in part by moving said tile toward and into contact with said frame;

said tiles being mounted to the outer faces of both sides of said frames in juxtaposed parallel relationship;

said tiles having a width substantially equal to the width of the frames to which said tiles are mounted and have a height such that at least two of said tiles are mounted in vertical juxtaposition on each of said frames;

some of said tiles having a decorative surface and other of said tiles having a structure to serve a function other than decorative in the work area defined by said framework and tiles;

whereby said tiles, whether decorative or functional, can be selectively interchanged easily and quickly with tiles mounted within the same frame or with tiles mounted on different frames within the system.

3. A work space management system according to claim 2 wherein said frames have a vertical row of slots in the face thereof and near the edges thereof for receiving bracket hooks to suspend functional components from said frames; and said tiles have a width slightly less than the width of said frames so that said tiles, when mounted on said frames, extend to a point short of said vertical row of slots to leave the same exposed.

4. A work space management system according to claim 2 wherein said tile-receiving means comprises openings in the face of said frames and said attaching means on said tiles further comprises hooks which fit within said openings.

5. A work space management system according to claim 2 wherein at least one of said outer tiles has a hard outer surface on which an erasable medium can be applied and erased to thereby form a marker surface.

6. A work space management system according to claim 2 wherein the tiles in each frame are in horizontal juxtaposition, thereby forming a strong horizontal line with said tiles.

7. A work space management system for dividing a space into separate work areas comprising:
a rigid structural framework formed of rigid structural rectangular frames rigidly joined together at the edges thereof to form at least one work area;
each of said frames having outer faces on opposite sides thereof and receiving means on said opposite sides of said frames;
a plurality of interchangeable tiles of relatively equal modular size and substantially common height, with each of said tiles having an attaching means cooperating with said receiving means on said frames for removably mounting said tiles to said frames for ease of placement on and removal from said frames;
said tiles being mounted to the outer faces of both sides of said frames in juxtaposed parallel relationship;
said tiles having a width substantially equal to the width of the frames to which said tiles are mounted and have a height such that at least two of said tiles are mounted in vertical juxtaposition on each of said frames;
some of said tiles having a decorative surface and at least one other of said tiles forms a rail tile having a plurality of horizontal rails on which work tools can be mounted;
whereby said tiles, whether decorative or rail tile, can be selectively interchanged easily and quickly with tiles mounted on the same or with tiles mounted on different frames within the system.

8. A work space management system for dividing a space into separate work areas comprising:
a rigid structural framework formed of rigid structural rectangular frames rigidly joined together at the edges thereof to form at least one work area;
each of said frames having outer faces on opposite sides thereof and receiving means on said opposite sides of said frames;
a plurality of interchangeable tiles of relatively equal modular size and substantially common height, with each of said tiles having an attaching means cooperating with said receiving means on said frames for removably mounting said tiles to said frames for ease of placement on and removal from said frames;
said tiles being mounted to the outer faces of both sides of said frames in juxtaposed parallel relationship;
said tiles having a width substantially equal to the width of the frames to which said tiles are mounted and have a height such that at least two of said tiles are mounted in vertical juxtaposition on each of said frames;
some of said tiles having a decorative surface and at least one other of said tiles comprising a housing, a shelf-forming means and means for pivotably mounting the shelf-forming means to the tile housing for movement between a vertical position flush with adjacent tiles and a horizontal position wherein said shelf-forming means serves as a support surface;
whereby said tiles, whether decorative or shelf tile, can be selectively interchanged easily and quickly with tiles mounted on the same frame or with tiles mounted on different frames within the system.

9. A work space management system for dividing a space into separate work areas comprising:
a rigid structural framework formed of rigid structural rectangular frames rigidly joined together at the edges thereof to form at least one work area;
each of said frames having outer faces on opposite sides thereof and receiving means on said opposite sides of said frames;
a plurality of interchangeable tiles of relatively equal modular size and substantially common height, with each of said tiles having an attaching means cooperating with said receiving means on said frames for removably mounting said tiles to said frames for ease of placement on and removal from said frames;
said tiles being mounted to the outer faces of both sides of said frames in juxtaposed parallel relationship;
said tiles having a width substantially equal to the width of the frames to which said tiles are mounted and have a height such that at least two of said tiles are mounted in vertical juxtaposition on each of said frames;
some of said tiles having a decorative surface;

at least two other tiles forming open tiles, mounted to opposite sides of one of said frames in parallel juxtaposition thereto and having openings therethrough in registry with each other to provide an opening through said rigid framework;

whereby said tiles, whether decorative or open tiles, can be selectively interchanged easily and quickly with tiles mounted on the same frame or with tiles mounted on different frames within the system.

10. A work space management system according to claim 9 and further comprising a shelf extending through the openings in the open tiles and mounted to a bottom portion thereof to form a shelf beneath said openings.

11. A work space management system for dividing a space into separate work areas comprising:

a rigid structural framework formed of rigid structural rectangular frames rigidly joined together at the edges thereof to form at least one work area;

each of said frames having outer faces on opposite sides thereof and receiving means on said opposite sides of said frames;

a plurality of interchangeable tiles of relatively equal modular size and substantially common height, with each of said tiles having an attaching means cooperating with said receiving means on said frames for removably mounting said tiles to said frames for ease of placement on and removal from said frames;

said tiles being mounted to the outer faces of both sides of said frames in juxtaposed parallel relationship;

said tiles having a width substantially equal to the width of the frames to which said tiles are mounted and have a height such that at least two of said tiles are mounted in vertical juxtaposition on each of said frames;

some of said tiles having a decorative surface and at least one other of said tiles forming a heater tile and having a heating element embedded therein;

whereby said tiles, whether decorative or heater tiles, can be selectively interchanged easily and quickly with tiles mounted on the same frame or with tiles mounted on different frames within the system.

12. A work space management system for dividing a space into separate work areas comprising:

a rigid structural framework formed of rigid structural rectangular frames rigidly joined together at the edges thereof to form at least one work area;

at least one of said frames having a substantially open central portion;

each of said frames having outer faces on opposite sides thereof and receiving means on said opposite sides of said frames;

a plurality of interchangeable tiles of relatively equal modular size and substantially common height, with each of said tiles having an attaching means cooperating with said receiving means on said frames for removably mounting said tiles to said frames for ease of placement on and removal from said frames;

said tiles being mounted to the outer faces of both sides of said frames in juxtaposed parallel relationship;

said tiles having a width substantially equal to the width of the frames to which said tiles are mounted and have a height such that at least two of said tiles are mounted in vertical juxtaposition on each of said frames;

some of said tiles having a decorative surface and at least one other of said tiles comprising a cabinet which extends into said at least one frame with a substantially open central portion;

whereby said tiles, whether decorative or cabinet, can be selectively interchanged easily and quickly with tiles mounted on the same frame or with tiles mounted on different frames within the system.

13. A work space management system according to claim 12 wherein said cabinet has a back wall and side walls, a top and bottom wall defining an open front, and a door mounted in the open front.

14. A work space management system according to claim 13 wherein the door on the open front is pivotably mounted to the top wall of the cabinet for vertical swinging motion with respect to the top wall, said side walls, at the front edges thereof, slanting downwardly and outwardly so that said front door is mounted at an acute angle to the vertical, and a ledge positioned on the bottom of said front door whereby said front door can serve as a display shelf.

15. A work space management system for dividing a space into separate work areas comprising:

a rigid structural framework formed of rigid structural rectangular frames rigidly joined together at the edges thereof to form at least one work area;

each of said frames having outer faces on opposite sides thereof and receiving means on said opposite sides of said frames;

a plurality of interchangeable tiles of relatively equal modular size and substantially common height, with each of said tiles having an attaching means cooperating with said receiving means on said frames for removably mounting said tiles to said frames for ease of placement on and removal from said frames;

said tiles being mounted to the outer faces of both sides of said frames in juxtaposed parallel relationship;

said tiles having a width substantially equal to the width of the frames to which said tiles are mounted and have a height such that at least two of said tiles are mounted in vertical juxtaposition on each of said frames;

some of said tiles having a decorative surface and at least one other of said tiles comprises a display shelf which extends downwardly and outwardly, and has a lip at the bottom portion thereof for supporting articles to be displayed;

whereby said tiles, whether decorative or display shelf tile, can be selectively interchanged easily and quickly with tiles mounted on the same frame or with tiles mounted on different frames within the system.

16. A work space management system for dividing a space into separate work areas comprising:

a rigid structural framework formed of rigid structural rectangular frames rigidly joined together at the edges thereof to form at least one work area;

each of said frames having outer faces on opposite sides thereof and receiving means on said opposite sides of said frames;

a plurality of interchangeable tiles of relatively equal modular size and substantially common height, with each of said tiles having an attaching means cooperating with said receiving means on said frames for removably mounting said tiles to said frames for ease of placement on and removal from said frames;

said tiles being mounted to the outer faces of both sides of said frames in juxtaposed parallel relationship;

said tiles having a width substantially equal to the width of the frames to which said tiles are mounted and have a height such that at least two of said tiles are mounted in vertical juxtaposition on each of said frames;

some of said tiles having a decorative surface;

at least one other tile is an illumination tile and has illumination means mounted thereon for illuminating an area adjacent thereto;

whereby said tiles, whether decorative or illumination tile, can be selectively interchanged easily and quickly with tiles mounted on the same frame or with tiles mounted on different frames within the system.

17. A work space management system for dividing a space into separate work areas comprising:

a rigid structural framework formed of rigid structural rectangular frames rigidly joined together at the edges thereof to form at least one work area;

each of said frames having outer faces on opposite sides thereof and receiving means on said opposite sides of said frames;

a plurality of interchangeable tiles of relatively equal modular size and substantially common height, with each of said tiles having attaching means cooperating with said receiving means on said frames for removably mounting said tiles to both sides of said frames in juxtaposed parallel relationship for ease of placement on and removal from said frames;

said attaching means comprising a spring clip engageable with said receiving means by substantially horizontal movement of said tile toward said frame and removable from said frame by substantially horizontal movement away from said frame;

said attaching means and said receiving means further comprising hook means for mounting said tile on said receiving means for rotation of said tiles outwardly about an axis, said hook means being spaced from said spring clip whereby said tiles can be mounted and removed randomly and independently without disturbing adjacent tiles;

said tiles having a width substantially equal to the width of the frames to which said tiles are mounted and have a height such that at least two of said tiles are mounted in vertical juxtaposition on each of said frames;

some of said tiles having a decorative surface and at least one other of said tiles having a structure to serve a function other than decorative in the work area defined by said framework and tiles;

whereby said tiles, whether decorative or functional, can be selectively interchanged easily and quickly with tiles mounted on the same frame or with tiles mounted on different frames within the system.

18. A work space management system according to claim 17 wherein said spring clip is mounted to an upper portion of said tile and said tile is mounted for rotation about a horizontal axis on said hook means.

19. A work space management system for dividing a space into separate work areas comprising:

a rigid structural framework formed of rigid structural rectangular frames rigidly joined together at the edges thereof to form at least one work area;

each of said frames having outer faces on opposite sides and receiving means;

a plurality of interchangeable tile modules, at least two of said tile modules each having a light transmitting pane;

means on said tile modules cooperating with said receiving means for removably mounting said tile modules to the outer faces of said frames so that said tile modules can be easily mounted to and demounted from said frames;

each of said frames having a plurality of said tile modules mounted on each side of said frames, with the two light transmitting tile modules mounted on opposite sides of one of said frames in facing parallel juxtaposition, said one frame having a substantially open central portion, whereby said pair of light transmitting tile modules forms a window through said one frame.

20. The work space management system of claim 19 wherein each of the light transmitting panes is clear.

21. The work space management system of claim 19 wherein each of the light transmitting pane tile modules includes casement means, each casement means comprising vertical and horizontal trim portions which cooperate with the vertical and horizontal trim portions of the casement means of a light transmitting pane tile module mounted on the opposite side of said one frame in facing parallel juxtaposition to hide the internal surfaces of the frame from view through the light transmitting panes.

22. The work space management system of claim 21 wherein each of the light transmitting panes is clear.

23. A work space management system for dividing a space into separate work areas comprising:

a rigid structural framework formed of rigid structural rectangular frames rigidly joined together at the edges thereof to form at least one work area;

each of said frames having outer faces on opposite sides and receiving means;

a plurality of interchangeable tile modules, at least one pair of said tile modules having a rectangular opening with trim means along the top, bottom and two sides of the opening to form an open tile module;

at least one light transmitting pane;

means on said tile modules cooperating with said receiving means for removably mounting said tile modules to the outer faces of said frames so that said tile modules can be easily mounted to and demounted from said frames;

each of said frames having a plurality of said tile modules mounted on each side of said frames, with the pair of open tile modules mounted on opposite sides of one of said frames in facing parallel juxtaposition, said one frame having a substantially open central portion, and said light transmitting pane mounted between said pair of open tile modules, whereby said pair of open tile modules and said light transmitting pane form a window through said one frame.

24. The work space management system of claim 23 wherein the one light transmitting pane is clear.

* * * * *

UNITED STATES PATENT AND TRADEMARK OFFICE
CERTIFICATE OF CORRECTION

PATENT NO. : 5,038,539
DATED : August 13, 1991
INVENTOR(S) : James O. Kelley et al.

It is certified that error appears in the above-identified patent and that said Letters Patent is hereby corrected as shown below:

In column 6, line 41, after "22" please insert --is--.
In column 20, claim 7, line 30, after "same" insert --frame--.

Signed and Sealed this

Fourth Day of May, 1993

Attest:

MICHAEL K. KIRK

*Attesting Officer*       Acting Commissioner of Patents and Trademarks

UNITED STATES PATENT AND TRADEMARK OFFICE
CERTIFICATE OF CORRECTION

PATENT NO. : 5,038,539
DATED : August 13, 1991
INVENTOR(S) : James O. Kelley, et al.

It is certified that error appears in the above-indentified patent and that said Letters Patent is hereby corrected as shown below:

ON THE TITLE PAGE

In column 1, under "Related U.S. Application Data" lines 2-3, delete "aban-doned" and insert -- now U.S. Patent No. 4,876,835 --.

In column 1, line 3, please insert -- This application is a continuation of application Serial No. 35,351, April 7, 1987, now U.S. Patent No. 4,876,835, which is a continuation-in-part of application Serial No. 648,900, September 10, 1984, U.S. Patent No. 4,685,255. --

Signed and Sealed this

Ninth Day of July, 1996

Attest:

BRUCE LEHMAN

Attesting Officer

Commissioner of Patents and Trademarks